United States Patent
Steadman

(10) Patent No.: US 11,776,090 B2
(45) Date of Patent: Oct. 3, 2023

(54) DYNAMIC PER-NODE PRE-PULLING IN DISTRIBUTED COMPUTING

(71) Applicant: SAS Institute Inc., Cary, NC (US)

(72) Inventor: Jody Bridges Steadman, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/560,656

(22) Filed: Dec. 23, 2021

(65) Prior Publication Data

US 2022/0327660 A1 Oct. 13, 2022

Related U.S. Application Data

(60) Provisional application No. 63/197,068, filed on Jun. 4, 2021, provisional application No. 63/174,021, filed on Apr. 12, 2021.

(51) Int. Cl.
*G06F 16/535* (2019.01)
*G06T 3/40* (2006.01)
*G06T 1/20* (2006.01)
*H04L 67/10* (2022.01)

(52) U.S. Cl.
CPC .......... *G06T 3/4046* (2013.01); *G06F 16/535* (2019.01); *G06T 1/20* (2013.01); *H04L 67/10* (2013.01)

(58) Field of Classification Search
CPC ...................................................... H04L 67/10
See application file for complete search history.

(56) References Cited

U.S. PATENT DOCUMENTS

| | | | |
|---|---|---|---|
| 6,703,947 B1 * | 3/2004 | Wallner | H03M 7/30 341/50 |
| 9,667,511 B2 * | 5/2017 | Nielsen | G06F 9/5055 |
| 10,649,679 B2 | 5/2020 | Gill et al. | |
| 10,666,443 B2 | 5/2020 | Vyas et al. | |
| 10,698,925 B1 | 6/2020 | Zhao et al. | |
| 10,775,976 B1 | 9/2020 | Abdul-Jawad et al. | |
| 10,776,355 B1 | 9/2020 | Batsakis et al. | |

(Continued)

OTHER PUBLICATIONS

Walsh, Dan., "Crictl Vs Podman" Red Hat—Hybrid Cloud—URL: https://cloud.redhat.com/blog/crictl-vs-podman—retrieved Jun. 1, 2021.

Shakury, Itay., "Kubernetes: Pre-pull images into node" GitHub Gist—URL: https://gist.github.com/taysk/7bc3e56d69c4d72a549286d98fd557dd—retrieved Jun. 1, 2021.

(Continued)

*Primary Examiner* — Hua Fan
(74) *Attorney, Agent, or Firm* — KDW FIRM PLLC

(57) ABSTRACT

An apparatus includes a processor to: receive an indication of ability of a node device to provide a resource for executing application routines, at least one identifier of at least one image including an executable routine stored within a cache of the node device, and an indication of at least one revision level of the at least one image; analyze the ability to provide the resource; in response to being able to support execution of the application routine, identify a first image in a repository; compare identifiers to determine whether there is a second image including a matching executable routine; in response to a match, compare revision levels; and in response to the revision level of the most recent version of the first image being more recent, retrieve the most recent version of the first image from the repository, and store it within the node device.

30 Claims, 22 Drawing Sheets

(56) References Cited

U.S. PATENT DOCUMENTS

| | | | |
|---|---|---|---|
| 10,796,023 | B2 | 10/2020 | Levin et al. |
| 10,810,003 | B2 | 10/2020 | Gainsborough et al. |
| 10,810,248 | B2 | 10/2020 | Tang et al. |
| 10,831,463 | B2 | 11/2020 | Liu et al. |
| 10,833,940 | B2 | 11/2020 | Cencini et al. |
| 10,871,922 | B2 | 12/2020 | East |
| 10,873,592 | B1 | 12/2020 | Singh et al. |
| 10,893,120 | B2 | 1/2021 | Seelam et al. |
| 10,909,221 | B2 | 2/2021 | Zhang et al. |
| 10,917,470 | B1 | 2/2021 | Zhuravlev et al. |
| 10,924,548 | B1 | 2/2021 | Karumbunathan et al. |
| 10,929,046 | B2 | 2/2021 | Coleman et al. |
| 10,929,415 | B1 | 2/2021 | Shcherbakov et al. |
| 10,936,293 | B2 | 3/2021 | Varadharajan Kannan |
| 10,956,222 | B2 | 3/2021 | Bahramshahry et al. |
| 10,963,189 | B1 | 3/2021 | Neelakantam et al. |
| 10,976,962 | B2 | 4/2021 | Karumbunathan et al. |
| 10,985,970 | B1 | 4/2021 | Goyal et al. |
| 10,985,997 | B2 | 4/2021 | Duggal et al. |
| 10,990,467 | B2 | 4/2021 | Parthasarathy et al. |
| 10,997,180 | B2 | 5/2021 | James et al. |
| 10,999,163 | B2 | 5/2021 | Abraham |
| 11,003,434 | B2 | 5/2021 | Duvur et al. |
| 11,010,191 | B1 | 5/2021 | Hornbeck |
| 11,019,023 | B1 | 5/2021 | Hegde et al. |
| 11,023,179 | B2 | 6/2021 | Karumbunathan et al. |
| 11,023,270 | B2 | 6/2021 | Mahajan et al. |
| 11,169,855 | B2 * | 11/2021 | Gauthier ................. H04L 67/10 |
| 2008/0256140 | A1 * | 10/2008 | Lazzaro ............. G06F 11/1451 707/999.203 |
| 2017/0344420 | A1 * | 11/2017 | Seibert .................. G06F 11/079 |

OTHER PUBLICATIONS

Author Unknown, "Images" Kubernetes—URL: https://gist.github.com/itaysk/7bc3e56d69c4d72a549286d98fd557dd—retrieved Jun. 1, 2021.

Senthil Raja Chermapandian., "Kube-fledged" GitHub—URL: https://github.com/senthilrch/kube-fledged—retrieved Jun. 4, 2021.

Author Unknown, "Pre-pull Docker images on Mesos and Kubernetes" Reddit—URL: https://www.reddit.com/r/devops/comments/6pve6g/prepull_docker_images_on_mesos_and_kubernetes/—retrieved Jun. 4, 2021.

Author Unknown., "What is CRICTL and Why Should You Care?" Dec. 3, 2018—URL: https://crunchtools.com/what-is-crictl-and-why-should-you-care/—retrieved Jun. 1, 2021.

Sturtevant, James., "Windows Containers on Windows 10 without Docker (using Containerd)" Apr. 1, 2021—URL: https://www.jamessturtevant.com/posts/Windows-Containers-on-Windows-10-without-Docker-using-Containerd/.

Grunert, Sascha., "Container Runtime Interface (CRI) CLI" GitHub—URL: https://github.com/kubernetes-sigs/cri-tools/blob/master/docs/crictl.md—retrieved Jun. 1, 2021.

Lasker, Steve., "Azure Container Registry Adds Teleportation" Oct. 29, 2019—URL: https://stevelasker.blog/2019/10/29/azure-container-registry-teleportation/.

Shakury, Itay., "The Single use Daemonset Pattern and Pre-pulling Images in Kubernetes" CodeFresh—Nov. 28, 2017—URL: https://codefresh.io/kubernetes-tutorial/single-use-daemonset-pattern-pre-pulling-images-kubernetes/.

Author Unknown, "Containerd Quick Start" gVisor—retrieved Jun. 1, 2021—URL: https://gvisor.dev/docs/user_guide/containerd/quick_start/.

* cited by examiner

DYNAMIC PER-NODE PRE-PULLING IN DISTRIBUTED COMPUTING

CROSS-REFERENCE TO RELATED APPLICATION

This application claims the benefit of priority under 35 U.S.C. § 119(e) to U.S. Provisional Application Ser. No. 63/174,021 filed Apr. 12, 2021, and to U.S. Provisional Application Ser. No. 63/197,068 filed Jun. 4, 2021, both of which are incorporated herein by reference in their respective entireties for all purposes.

BACKGROUND

Distributed development and execution of task routines using pooled task routines with pooled data has advanced to an extent that the addition of mechanisms for organization of development and to provide oversight for reproducibility and accountability have become increasingly desired. In various scientific, technical and other areas, the quantities of data employed in performing analysis tasks have become ever larger, thereby making desirable the pooling of data objects to enable collaboration, share costs and/or improve access. Also, such large quantities of data, by virtue of the amount and detail of the information they contain, have become of such value that it has become desirable to find as many uses as possible for such data in peer reviewing and in as wide a variety of analysis tasks as possible. Thus, the pooling of components of analysis routines to enable reuse, oversight and error checking has also become desirable.

The increasingly predominant use of distributed computing resources, including processing resources, storage and/or communications resources across multiple physical and or virtual computing devices, has caused greater precision in the allocation of such resources to become increasingly desired. The approach of dedicating the resources of computing devices to remaining open and available for use by particular users and/or for particular purposes, regardless of degree of actual use such that those resources are frequently unused, has given way to the approach of dynamically allocating and re-allocating even relatively small portions of such resources to many different users and/or for many different purposes. Thus, the ability to increase the efficiency with which such dynamical allocating is able to be performed has also become desirable. Among these is the desire to increase the efficiency of the pre-provisioning of physical and/or virtual computing devices with various relatively large program and/or data objects.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes at least one processor and a storage to store instructions that, when executed by the at least one processor, cause the at least one processor to perform pre-pulling operations including receive, at the at least one processor and from a node device via a network: an indication of ability of the node device to provide a resource required to support execution of application routines within the node device; at least one identifier of at least one image that is stored within a cache of the node device, and that comprises an executable routine that is required to support the execution of application routines within the node device; and an indication of at least one revision level of the at least one image stored within the cache. The at least one processor is also caused to: analyze the indication of ability of the node device to provide the resource to determine whether the node device is able to support the execution of an application routine; in response to a determination that the node device is able to support the execution of the application routine, identify a first image that is stored in a repository, and that comprises an executable routine that is required to support the execution of the application routine within the node device; and compare each identifier of the at least one identifier to the identity of the first image to determine whether, among the at least one image stored in the cache, there is a second image that comprises an executable routine that matches the executable routine of the first image. The at least one processor is also caused to, in response to a match between the identity of the first image and an identifier of a second image stored within the cache, the at least one processor is caused to perform operations including, compare a revision level of a most recent version of the first image to a revision level of the second image, and in response to the revision level of the most recent version of the first image being more recent than the revision level of the second image, the at least one processor is caused to perform operations including: retrieve the most recent version of the first image from the repository; and store the first image within the node device, wherein the storage of the first image within the node device triggers storage of a copy of the first image within the cache of the node device.

A computer-program product tangibly embodied in a non-transitory machine-readable storage medium includes instructions operable to cause at least one processor to perform pre-pulling operations including receive, at the at least one processor and from a node device via a network: an indication of ability of the node device to provide a resource required to support execution of application routines within the node device; at least one identifier of at least one image that is stored within a cache of the node device, and that comprises an executable routine that is required to support the execution of application routines within the node device; and an indication of at least one revision level of the at least one image stored within the cache. The at least one processor is also caused to: analyze the indication of ability of the node device to provide the resource to determine whether the node device is able to support the execution of an application routine; in response to a determination that the node device is able to support the execution of the application routine, identify a first image that is stored in a repository, and that comprises an executable routine that is required to support the execution of the application routine within the node device; and compare each identifier of the at least one identifier to the identity of the first image to determine whether, among the at least one image stored in the cache, there is a second image that comprises an executable routine that matches the executable routine of the first image. The at least one processor is also caused to, in response to a match between the identity of the first image and an identifier of a second image stored within the cache, the at least one processor is caused to perform operations including, compare a revision level of a most recent version of the first image to a revision level of the second image, and in response to the revision level of the most recent version of the first image being more recent than the revision level of the second image, the at least one processor is caused to perform operations including: retrieve the most recent version of the first image from the repository; and store the first image within the node device, wherein the storage of the first image within the node device triggers storage of a copy of the first image within the cache of the node device.

The indication of ability of the node device to provide the resource may include an indication of a degree of availability of a processor of the node device to execute the application routine, and an indication of an instruction set supported by the processor of the node device; and identifying the first image may include identifying an image stored in the repository that comprises an executable routine that is compatible with the instruction set supported by the processor of the node device.

The indication of ability of the node device to provide the resource may include an indication of whether the node device includes a graphics processing unit (GPU), and in response to an indication that the node device includes a GPU, the at least one processor may be caused to perform operations including: analyze indications, from the repository, of characteristics of each image of multiple images of the application routine stored in the repository to determine whether an image of the multiple images of the application routine supports use of a GPU; and in response to a determination that an image of the multiple images of the application routine does support use of a GPU, retrieve the image of the application routine that supports use of a GPU from the repository as the first image.

The indication of ability of the node device to provide the resource may include an indication of whether the node device includes a neuromorphic device that is programmable to implement a neural network, and in response to an indication that the node device includes a neuromorphic device, the at least one processor may be caused to perform operations including: analyze indications, from the repository, of characteristics of each image of multiple images of the application routine stored in the repository to determine whether an image of the multiple images of the application routine supports use of a neuromorphic device; and in response to a determination that an image of the multiple images of the application routine does support use of a neuromorphic device, retrieve, from the repository, at least one of the image of the application routine that supports use of a neuromorphic device, or an image of neural network configuration data required to configure the neuromorphic device to implement a trained neural network to support execution of the application routine.

The execution of the application routine within the node device may require a license to be granted that authorizes execution of the application routine within the node device; and the indication of ability of the node device to provide the resource comprises an indication of whether the node device is currently granted the license. The at least one processor is caused to perform operations including: analyze the indication of degree of ability of the node device to provide the resource to determine if the node device is currently granted the license; and condition at least the storage of the first image within the node device on a determination that the node device is currently granted the license.

The execution of the application routine within the node device may require access to a data set; access to the data set may require a license to be granted that assigns authority to access the data set to application routines that are executed on the node device; and the indication of ability of the node device to provide the resource may include an indication of whether the node device is currently granted the license. The at least one processor may be caused to perform operations including: analyze the indication of degree of ability of the node device to provide the resource to determine if the node device is currently granted the license; and condition at least the storage of the first image within the node device on a determination that the node device is currently granted the license.

The at least one processor may be caused to perform operations including: receive, from the node device, an indication of specialization of the node device to restrict the node device to executing a pre-determined limited subset of types of application routines; analyze the indication of specialization to identify a subset of multiple application routines that are among the limited subset of types of application routines, and for which images are available in the repository; and restrict the analysis of the ability of the node device to provide the resource to determine whether the node device is able to support the execution of an application to the subset of multiple application routines.

The node device allocates the resource by dynamically allocating multiple container environments that each consume a portion of the resource to enable execution of multiple application routines across the multiple container environments in parallel; the resource comprises at least one of a processor of the node device or storage space within a storage of the node device; and the first image comprises at least one of a copy of the application routine or a copy of a library routine required to support the execution of the application routine within a container environment of the multiple container environments.

In response to a lack of match between the identity of the first image and an identifier of an image stored within the cache, the at least one processor may be caused to perform operations including: retrieve the most recent version of the first image from the repository; and store the first image within the node device to trigger storage of a copy of the first image within the cache of the node device.

At least one of a least recently accessed image of an executable routine or a least frequently accessed image of an executable routine among the at least one image of an executable routine stored within the cache may be evicted from the cache to enable storage of another image of an executable within the cache in response to the other image being currently required to execute another application routine; and the at least one processor may be caused to repeat the pre-pulling operations on a recurring interval of time.

A computer-implemented method comprises performing pre-pulling operations includes receiving, by at least one processor and from a node device via a network: an indication of ability of the node device to provide a resource required to support execution of application routines within the node device; at least one identifier of at least one image that is stored within a cache of the node device, and that comprises an executable routine that is required to support the execution of application routines within the node device; and an indication of at least one revision level of the at least one image stored within the cache. The method also includes: analyzing, by the at least one processor, the indication of ability of the node device to provide the resource to determine whether the node device is able to support the execution of an application routine; in response to a determination that the node device is able to support the execution of the application routine, identifying, by the at least one processor, a first image that is stored in a repository, and that comprises an executable routine that is required to support the execution of the application routine within the node device; and comparing each identifier of the at least one identifier to the identity of the first image to determine whether, among the at least one image stored in the cache, there is a second image that comprises an executable routine that matches the executable routine of the first image. The method also includes, In response to a match between the identity of the first image and an identifier of a second image stored within the cache, performing operations including comparing a revision level of a most recent version of the first image to a revision level of the second image, and in response to the revision level of the most recent version of the first image being more recent than the revision level of the second image, performing operations including: retrieve the most recent version of the first image from the repository; and store the first image within the node device, wherein the storage of the first image within the node device triggers storage of a copy of the first image within the cache of the node device.

The indication of ability of the node device to provide the resource may include an indication of a degree of availability of a processor of the node device to execute the application routine, and an indication of an instruction set supported by the processor of the node device; and identifying the first image may include identifying, by the at least one processor, an image stored in the repository that comprises an executable routine that is compatible with the instruction set supported by the processor of the node device.

The indication of ability of the node device to provide the resource may include an indication of whether the node device includes a graphics processing unit (GPU), and the method may include, in response to an indication that the node device includes a GPU, performing operations include: analyzing, by the at least one processor, indications, from the repository, of characteristics of each image of multiple images of the application routine stored in the repository to determine whether an image of the multiple images of the application routine supports use of a GPU; and in response to a determination that an image of the multiple images of the application routine does support use of a GPU, retrieving the image of the application routine that supports use of a GPU from the repository as the first image.

The indication of ability of the node device to provide the resource may include an indication of whether the node device includes a neuromorphic device that is programmable to implement a neural network, and the method may include, in response to an indication that the node device includes a neuromorphic device, performing operations including: analyzing, by the at least one processor, indications, from the repository, of characteristics of each image of multiple images of the application routine stored in the repository to determine whether an image of the multiple images of the application routine supports use of a neuromorphic device; and in response to a determination that an image of the multiple images of the application routine does support use of a neuromorphic device, retrieving, from the repository, at least one of the image of the application routine that supports use of a neuromorphic device, or an image of neural network configuration data required to configure the neuromorphic device to implement a trained neural network to support execution of the application routine.

The execution of the application routine within the node device may require a license to be granted that authorizes execution of the application routine within the node device; and the indication of ability of the node device to provide the resource comprises an indication of whether the node device is currently granted the license. The method may include performing operations including: analyzing, by the at least one processor, the indication of degree of ability of the node device to provide the resource to determine if the node device is currently granted the license; and conditioning, by the at least one processor, at least the storage of the first image within the node device on a determination that the node device is currently granted the license.

The execution of the application routine within the node device may require access to a data set; access to the data set may require a license to be granted that assigns authority to access the data set to application routines that are executed on the node device; and the indication of ability of the node device to provide the resource may include an indication of whether the node device is currently granted the license. The method may include performing operations comprising: analyzing, by the at least one processor, the indication of degree of ability of the node device to provide the resource to determine if the node device is currently granted the license; and conditioning, by the at least one processor, at least the storage of the first image within the node device on a determination that the node device is currently granted the license.

The method may include: receiving, by the at least one processor and from the node device, an indication of specialization of the node device to restrict the node device to executing a pre-determined limited subset of types of application routines; analyzing, by the at least one processor, the indication of specialization to identify a subset of multiple application routines that are among the limited subset of types of application routines, and for which images are available in the repository; and restrict, by the at least one processor, the analysis of the ability of the node device to provide the resource to determine whether the node device is able to support the execution of an application to the subset of multiple application routines.

The node device may allocate the resource by dynamically allocating multiple container environments that each consume a portion of the resource to enable execution of multiple application routines across the multiple container environments in parallel; the resource may include at least one of a processor of the node device or storage space within a storage of the node device; and the first image may include at least one of a copy of the application routine or a copy of a library routine required to support the execution of the application routine within a container environment of the multiple container environments.

The method may include, in response to a lack of match between the identity of the first image and an identifier of an image stored within the cache, performing operations including: retrieving the most recent version of the first image from the repository; and storing the first image within the node device to trigger storage of a copy of the first image within the cache of the node device.

At least one of a least recently accessed image of an executable routine or a least frequently accessed image of an executable routine among the at least one image of an executable routine stored within the cache may be evicted from the cache to enable storage of another image of an executable within the cache in response to the other image being currently required to execute another application routine; and the method may include repeating, by the at least one processor, the pre-pulling operations on a recurring interval of time.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

DETAILED DESCRIPTION

Figure 1:
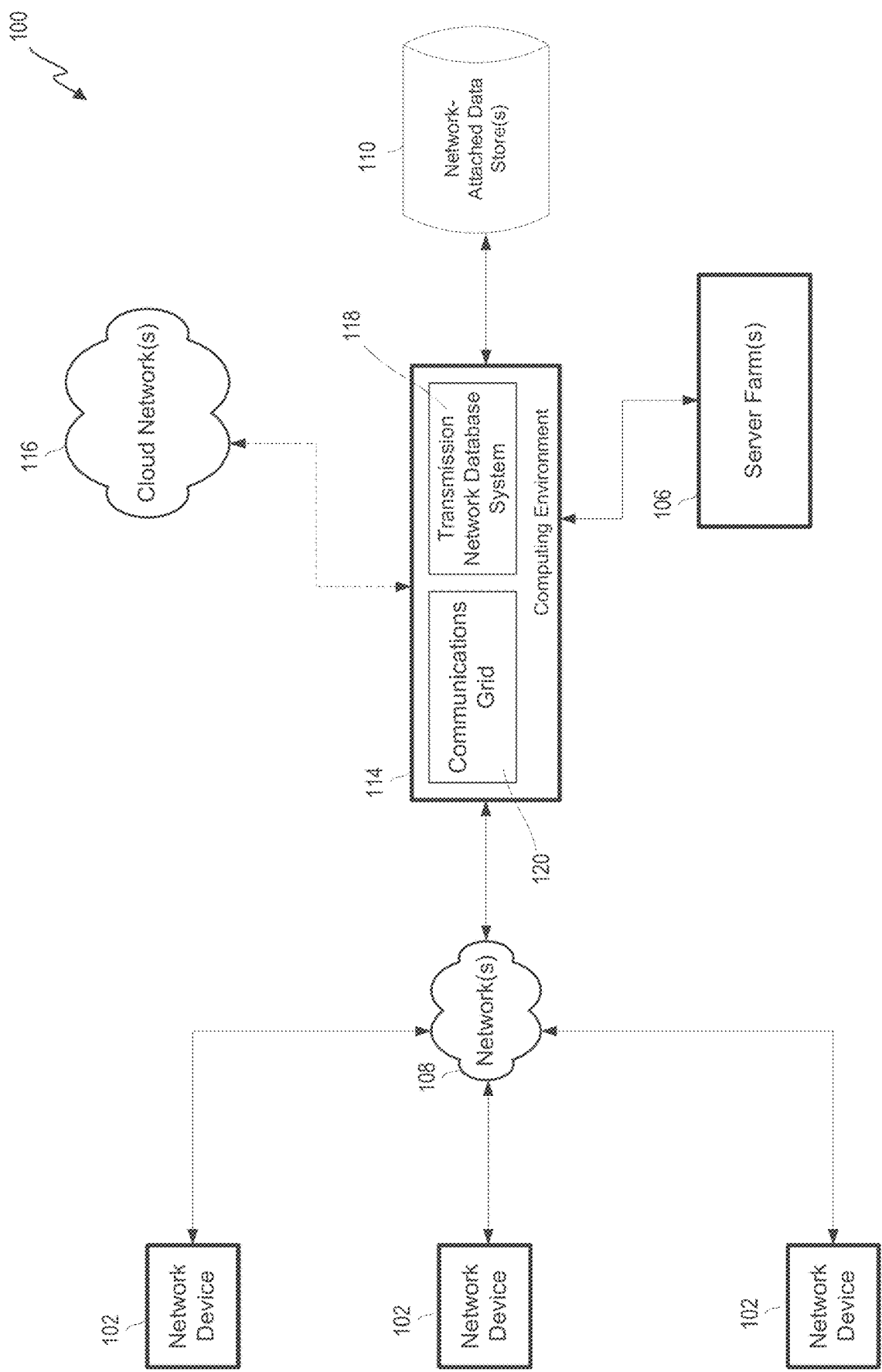
FIG. 1 illustrates a block diagram that provides an illustration of the hardware components of a computing system, according to some embodiments of the present technology.

Various embodiments described herein are generally directed to techniques for the use of dynamic pre-pulling of containers from remote repository storage to improve the speed and/or efficiency of execution of application routines in distributed processing systems in which the processing resources of multiple computing devices are dynamically allocated. A distributed processing system may employ one or more resource allocation routine(s) to dynamically assign and/or monitor the use of processing, storage, communications and/or still other resources of multiple computing devices to execute a dynamically changing set of application routines in parallel. Such resource allocation routine(s) may monitor the availability of such resources provided by each computing device and/or the degree to which each application routine consumes such resources on an ongoing basis, and may dynamically re-allocate such resources as application routines are being executed.

As will be familiar to those skilled in the art, the quantity and/or combination of resources consumed by the execution of an application routine often dynamically changes over the time during which the application routine is executed. Also, various external influences, including run-time conditional branching decisions, may cause the consumption of resources for each instance of execution of an application routine to change from one instance of execution to another. Thus, deriving an accurate prediction of what resources will be consumed throughout the execution of an application routine may not be possible. This adds to the unpredictability of what resources, and/or in what amounts, will be needed within a distributed processing system in which there is an ever-changing mixture of application routines that are requested to be executed by multiple entirely uncoordinated requesters over time.

Alternatively or additionally, changes in the computing devices that are included in a distributed processing system may impose a degree of unpredictability in the processing resources that are available. As will be familiar to those skilled in the art, malfunctions within computing devices and/or of the networks by which computing devices are made accessible may cause the unexpected loss of the resources provided by one or more computing devices, even as application routines are being executed. Apart from such failures, computing devices being added to and/or removed from a distributed processing system for maintenance, upgrades and/or other changes may also impose a degree of unpredictability in the processing resources that are available. Such an inability to accurately predict the provision and/or consumption of resources impairs the ability to allocate resources in a proactive manner, thereby making the efficient allocation of resources for the execution of a dynamically changing combination of application routines in parallel at least partially reactive.

An approach to the deployment of resources by resource allocation routines in such a dynamically changing environment entails dynamically controlling the execution of multiple application routines (and thereby dynamically controlling the consumption of resources) through the dynamic allocation of container environments in which entire application routines, and/or portions of application routines, may be executed in parallel across multiple computing devices. As a result of the aforedescribed necessarily reactive nature of allocating resources, such dynamic allocation of containers may be required to take on something of an opportunistic behavior in which such resource allocation routine(s) may dynamically instantiate and/or uninstantiate container environments for the execution of routines. Thus, such dynamic allocation of container environments may be made based on a combination of at least what resources are expected to be required to support the execution of each application routine (to the degree that this can be known with appreciable accuracy), what resources are expected to be provided by each computing device (apart from unforeseen changes), what resources are observed to actually be consumed by each routine, and/or what resources are observed as actually being provided by each computing device.

As will also be familiar to those skilled in the art, adding to the complexity of allocating resources across multiple computing devices of a distributed processing system may be situations in which there is some degree of specialization in the types of resources that are provided by each computing device. By way of example, there may be multiple differing types of processing resources that may include central processing units of differing architectures across different computing devices, and/or differing specialized processing units (e.g., graphics processing units (GPUs) and/or hardware-based artificial intelligence (AI) processing units). By way of another example, there may be multiple differing types of storage resources that may include arrays of mechanical storage devices (e.g., ferrous-oxide type hard drives), and/or differing forms of solid state storage devices (e.g., volatile and/or non-volatile storage devices). Thus, each computing device may provide a differing combination of different types of each of such resources. Additionally, it may be that differing application routines may be designed to require (or to at least have an affinity for using) various specific type(s) of each of such resources. By way of example, an application routine may be executable within a computing device that does not include a GPU, but may have been designed to take advantage of a GPU to achieve faster execution when a GPU is available. Also by way of example, an application routine may require a more recent version of an instruction set that has evolved over time throughout a family of CPUs such that CPUs of later generation(s) are required to execute that application routine. Such situations may limit which application routines are able to executed on which devices.

Alternatively or additionally, limitations on which application routines are able to be executed on which computing devices may arise from the imposition of licensing agreements and/or other requirements that may have nothing to do with ability of each computing device to support the execution of various different application routines. By way of example, there may be contractual limitations and/or other externally imposed limitations that require that particular application routines, and/or particular routines supporting the execution of application routines, to be executed just within particular computing devices of a distributed processing system. By way of example, it may be that a licensing key required to enable the execution of particular application routine(s), and/or to enable the execution of particular routines required to support the execution of particular application routine(s), may be required to be associated with just a particular computing device. A resource allocation routine may, therefore, be required to match particular requirements for the execution of particular application routines with particular computing devices that are able to meet those requirements.

An example of such a resource allocation routine that has gained wide acceptance in recent years is Kubernetes offered by the Cloud Native Computing Foundation of San Francisco, CA, USA. Kubernetes dynamically allocates individual container environments, and/or multiples of container environments, within "pods" that are dynamically allocated. Thus, as application routines are executed within a distributed processing system, pods of various configurations are instantiated with one or more container environments within each pod to enable the execution of some or all threads of an application routine within each pod.

Still another complication that may introduced in efforts to efficiently allocate resources in a distributed processing system may be the behavior of various system routines incorporated into individual computing devices, such as caching routines that seek to improve the speed of execution of routines, and/or the speed at which the execution of routines begin, by maintaining a cache that stores copies of recently executed application routines, and/or data recently used as input to an application routine and/or recently generated as an output of an application routine. As will be familiar to those skilled in the art, the finite storage capacities of such caches necessarily limit what can be stored. Also, although many current day cache management routines may accurately predict what should remain stored in a cache versus what should be evicted therefrom on the majority of occasions, there will inevitably be occasions in which something that is needed for the execution of an application routine within a particular computing device is not available in a cache maintained therein when needed to begin execution of that application routine. Such a cache miss necessarily results in delaying the execution of that application routine such that there is a delay in the consumption of resources that will be needed to execute that application routine, and a consumption of other resources to retrieve what was needed to begin execution from other devices via a network. Thus, such uncoordinated interactions between caching routine(s) and container-based resource allocation routines can yield unpredictable changes in availability and consumption of resources.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
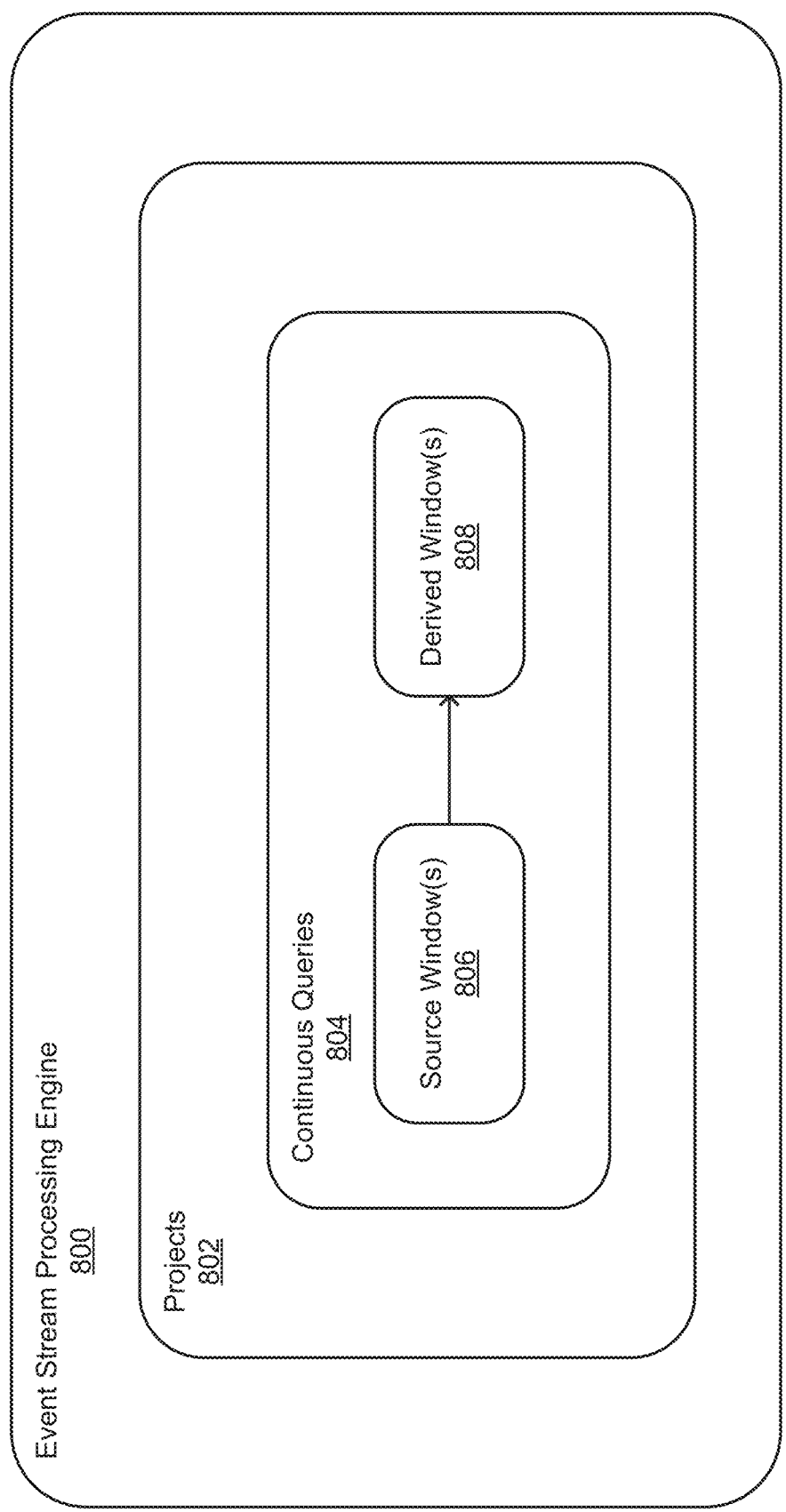
FIG. 8 illustrates a block diagram including components of an Event Stream Processing Engine (ESPE), according to embodiments of the present technology.
Figure 9:
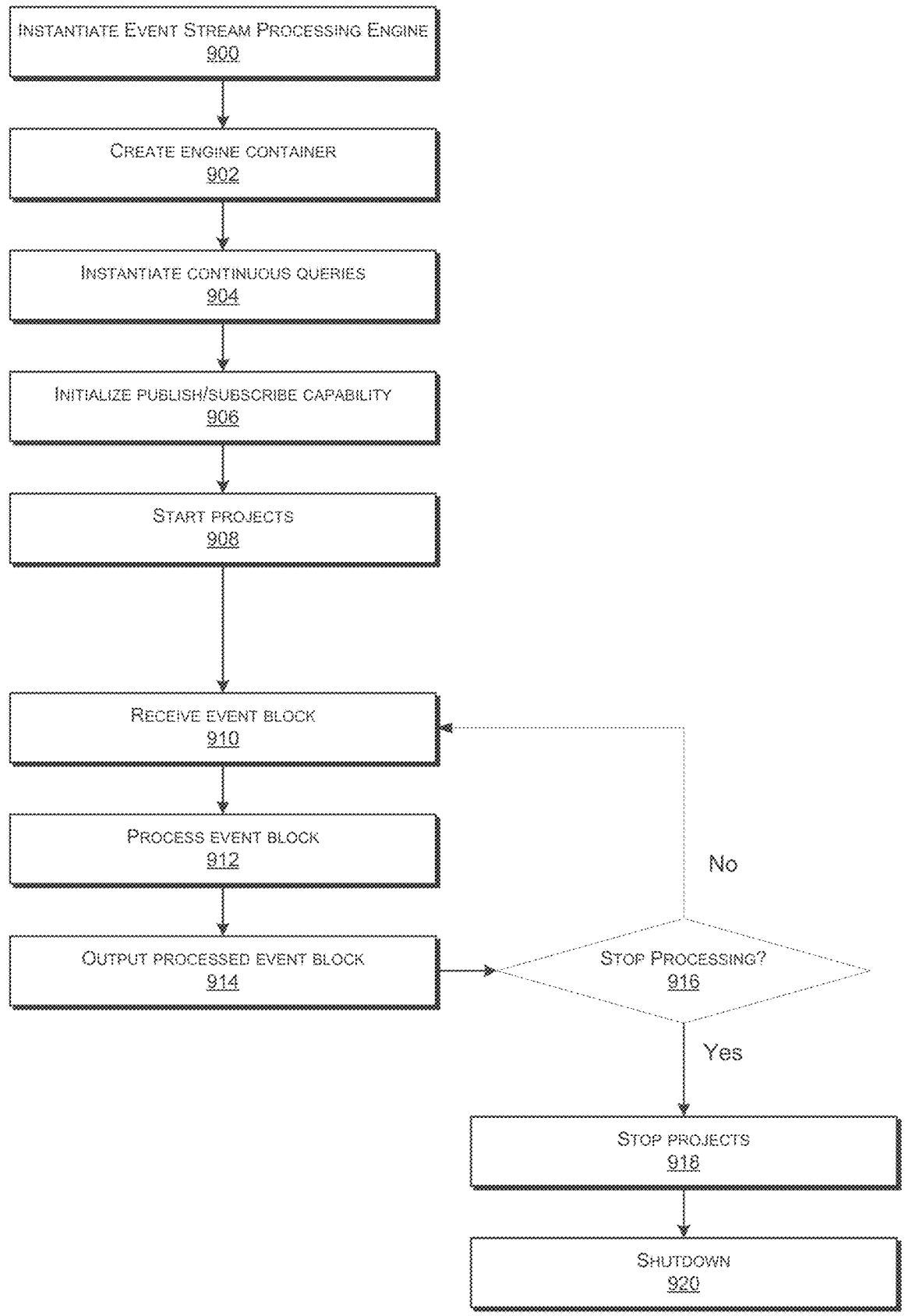
FIG. 9 illustrates a flow chart showing an example process including operations performed by an event stream processing engine, according to some embodiments of the present technology.
Figure 10:
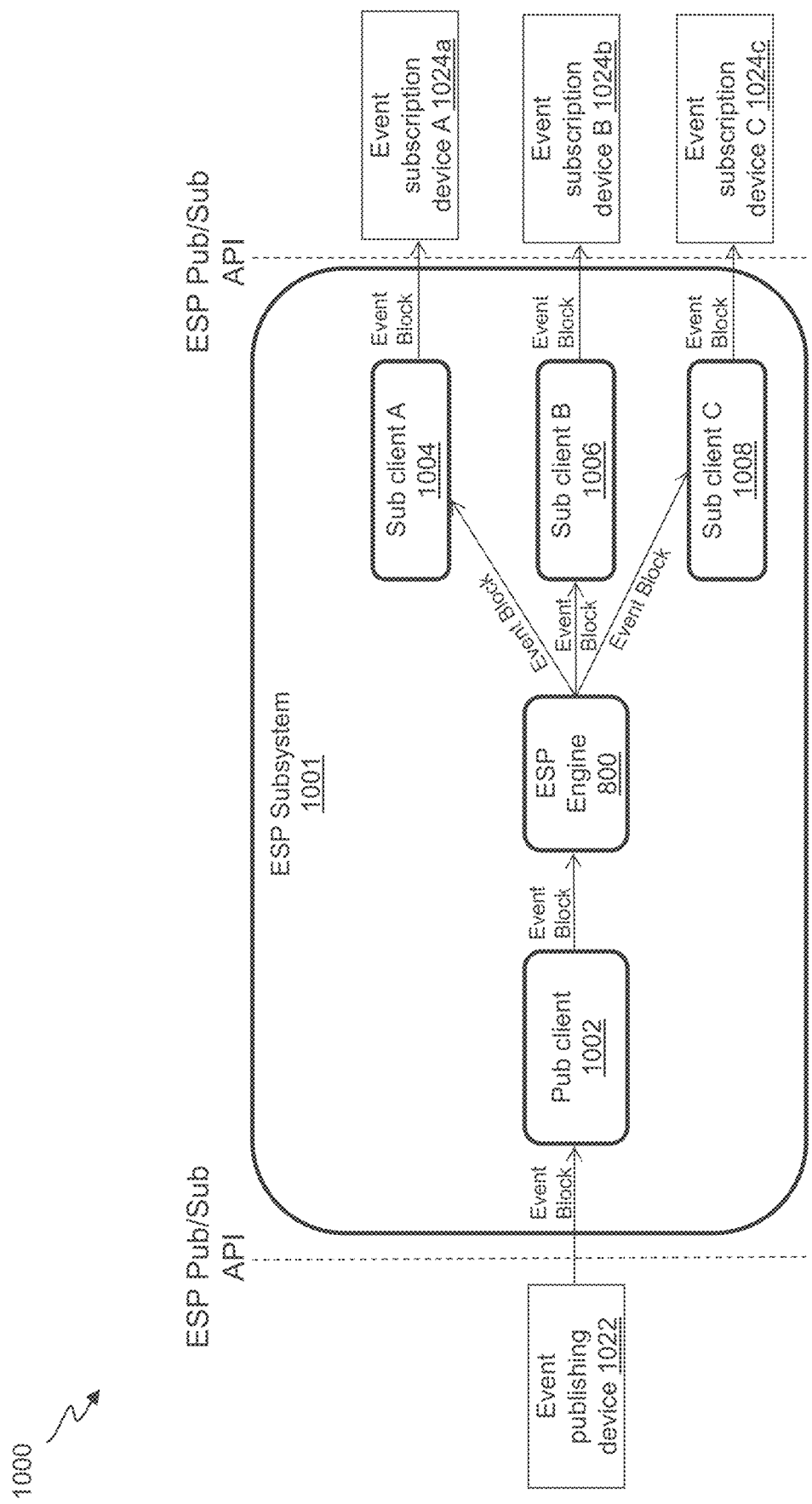
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
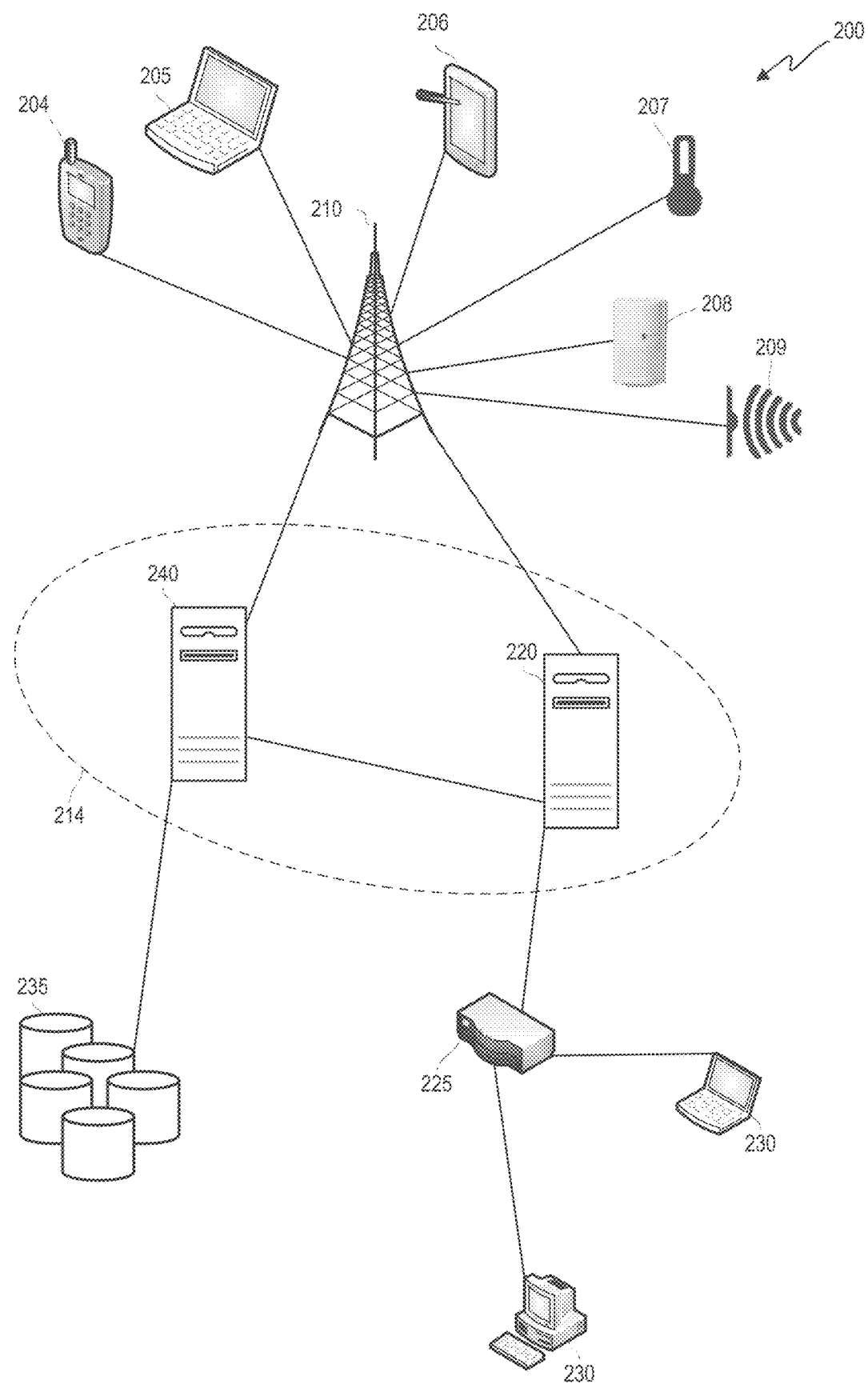
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
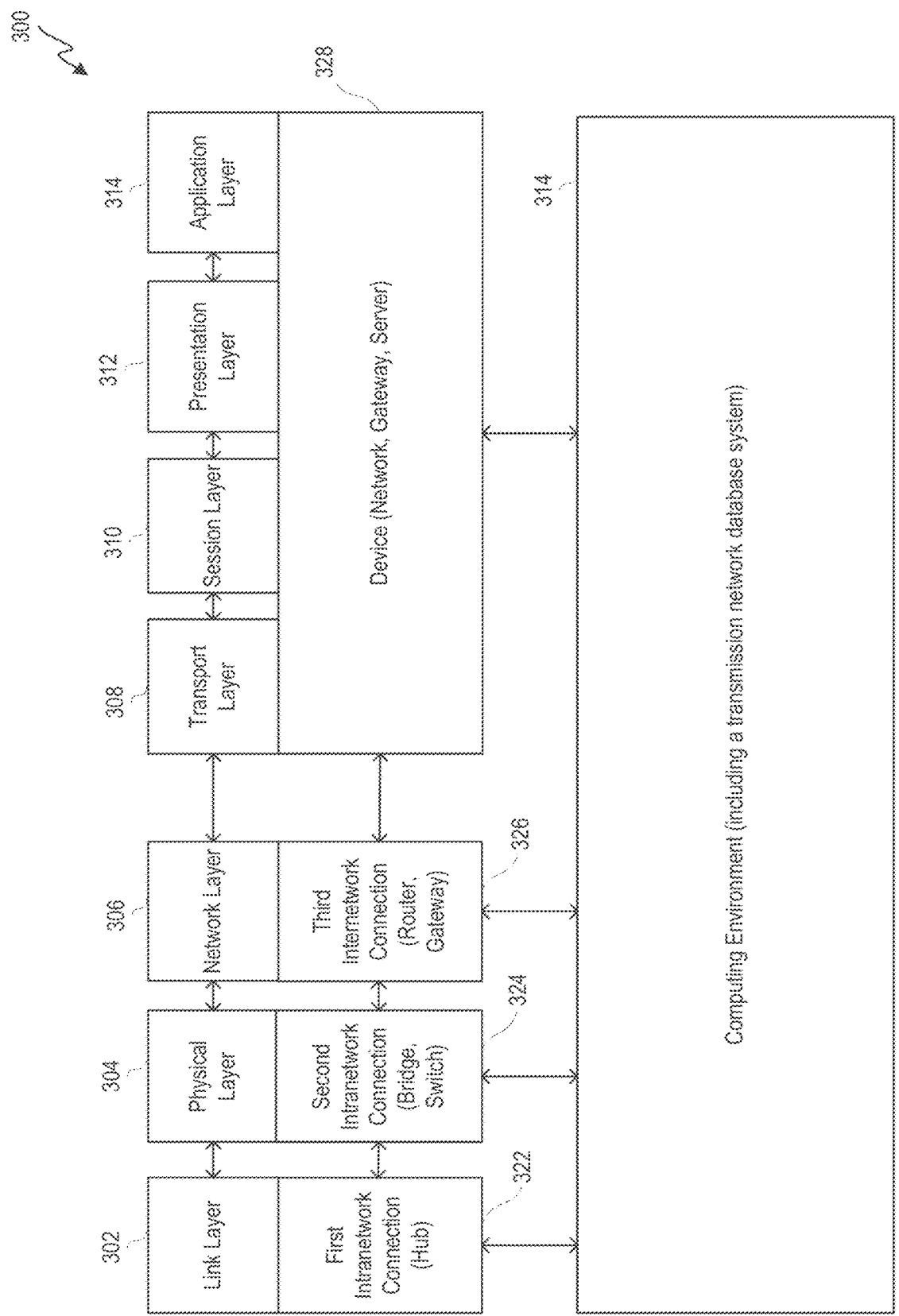
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
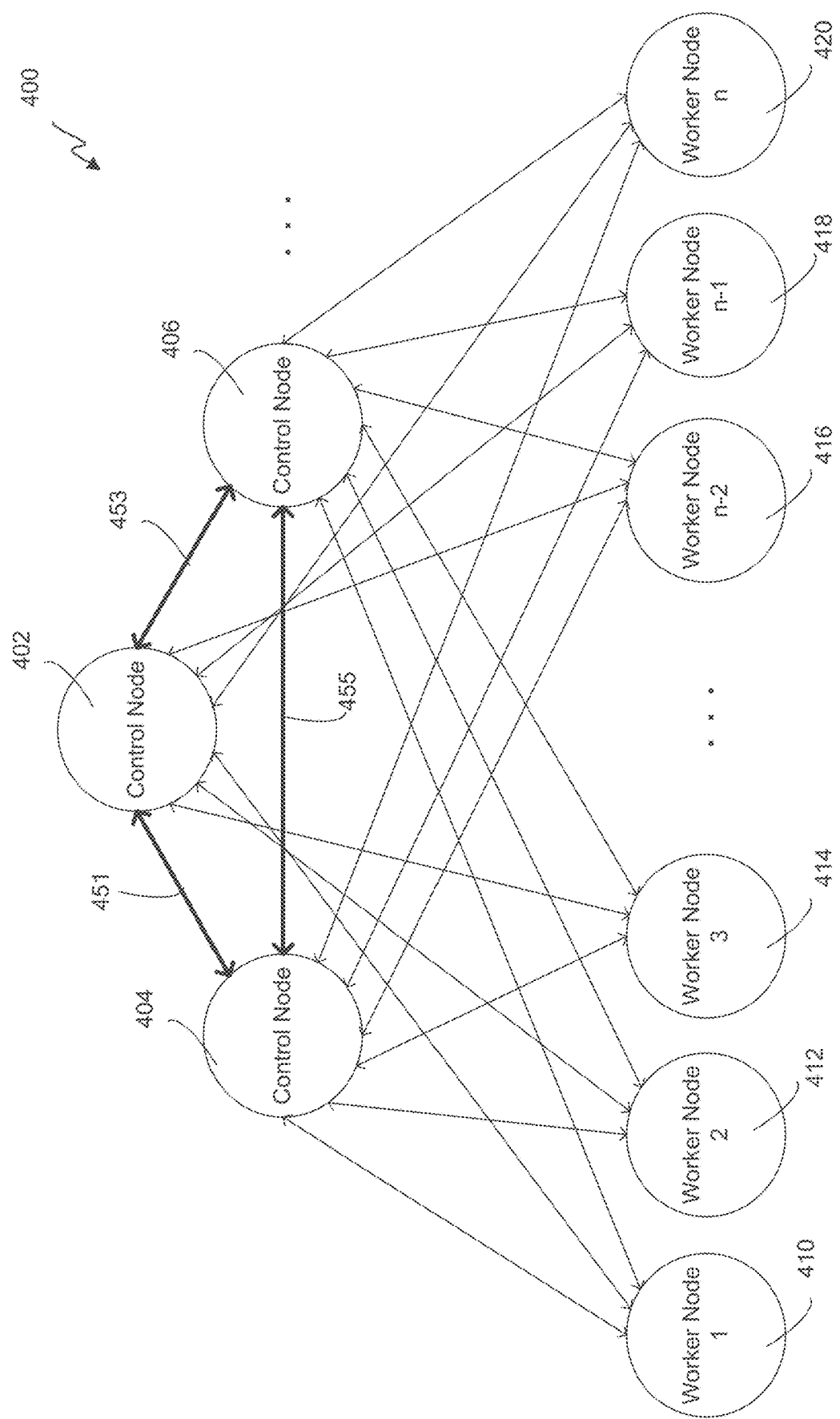
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® distributed file system, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
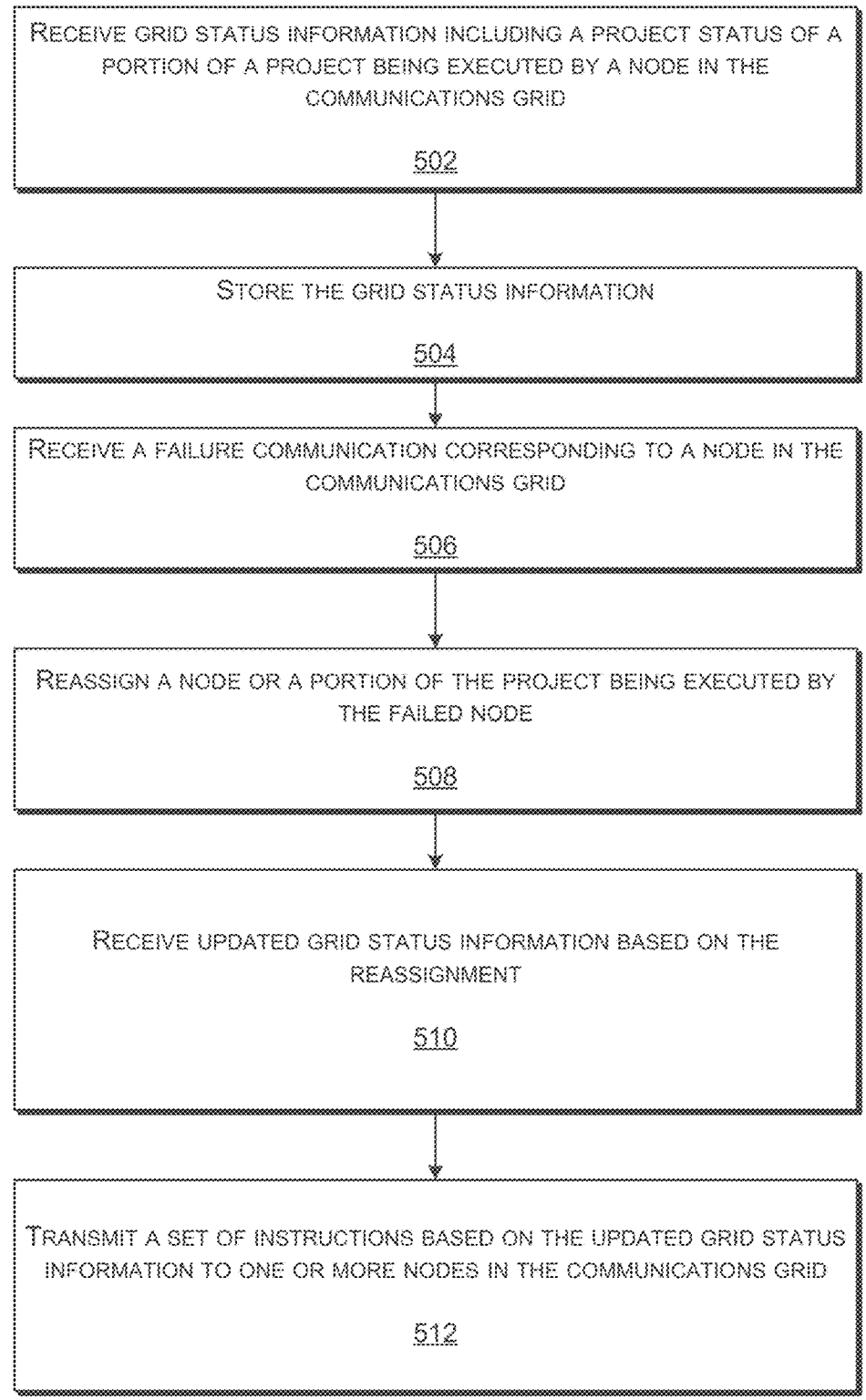
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
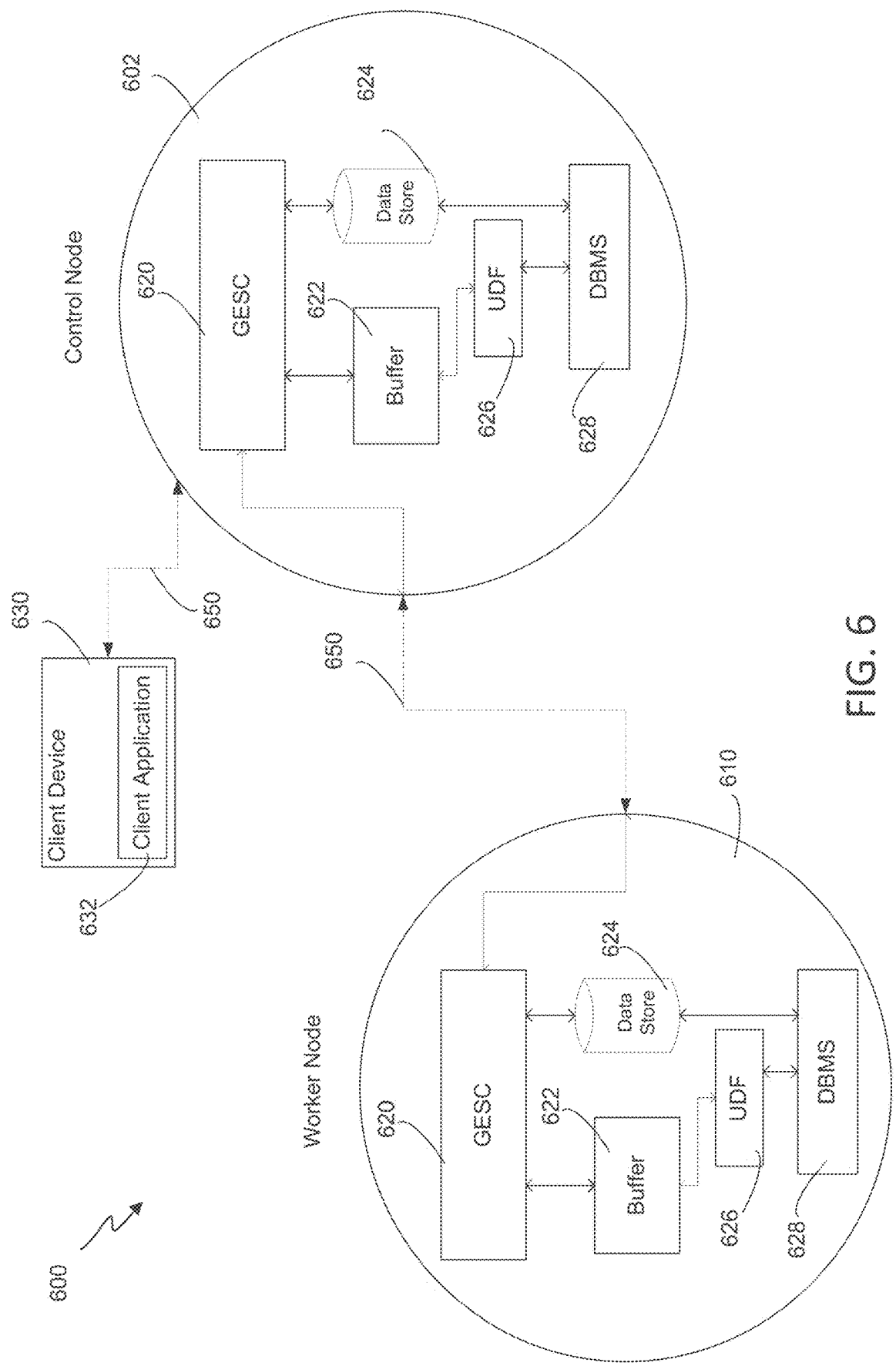
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
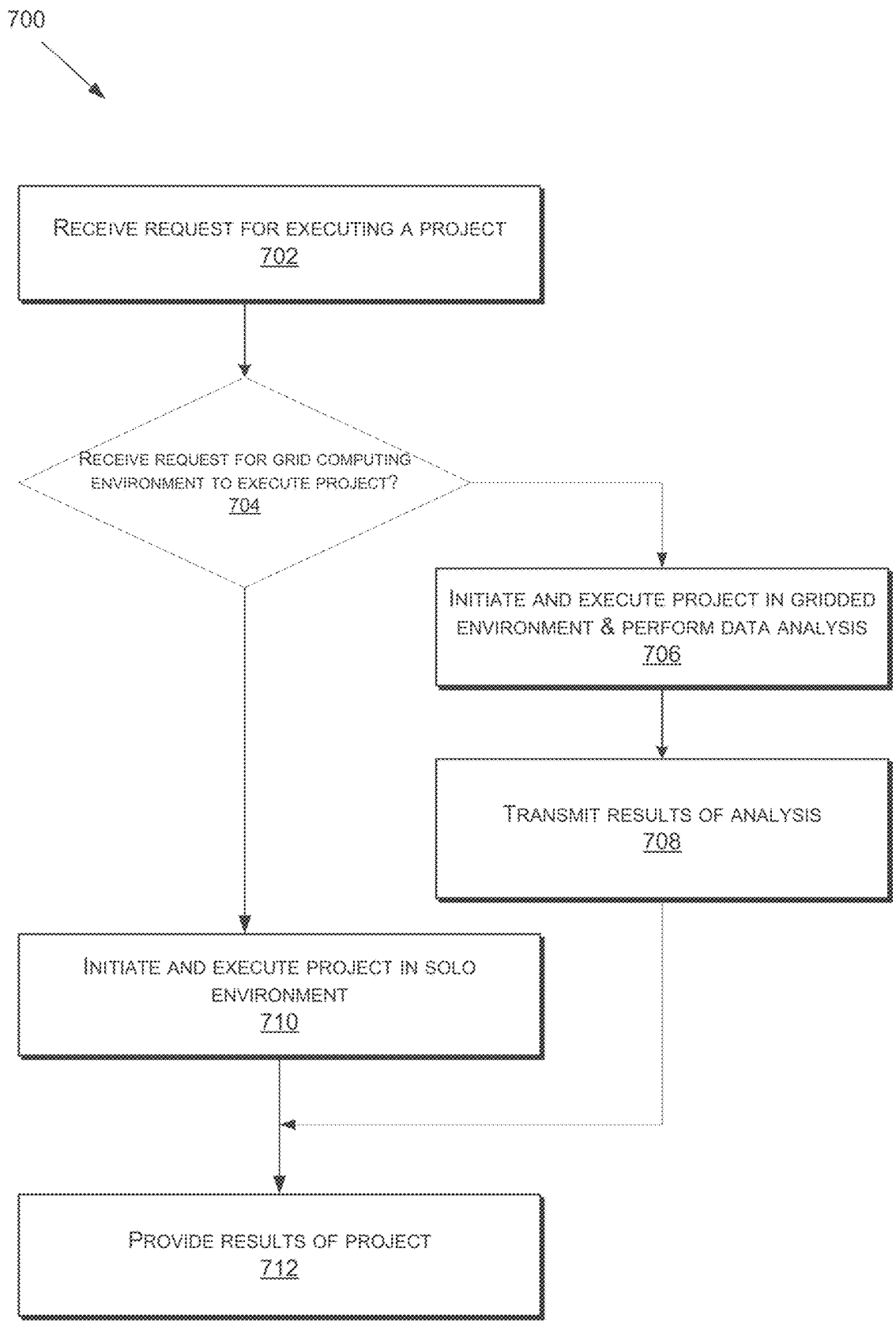
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
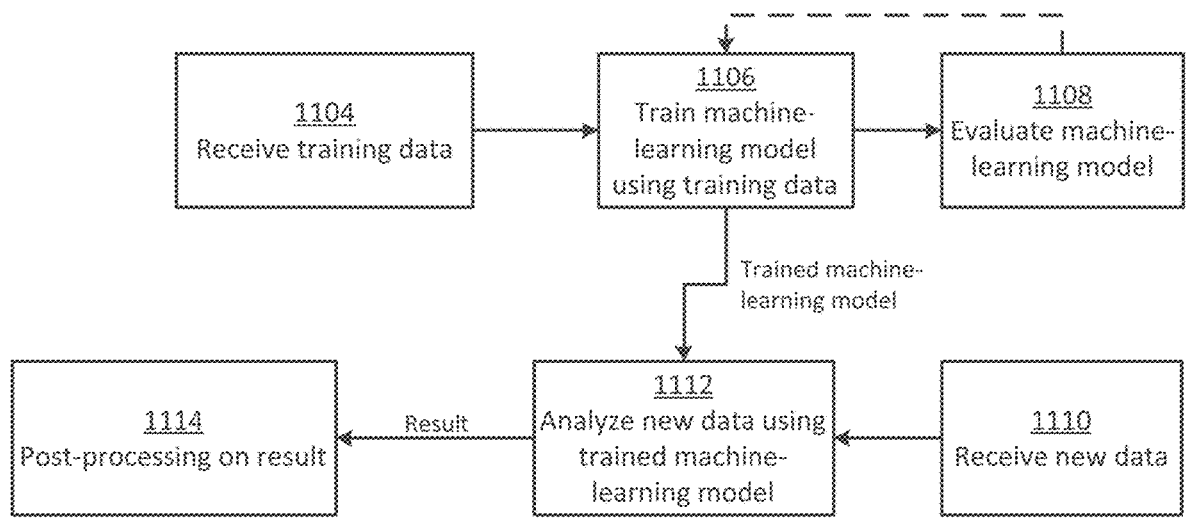
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
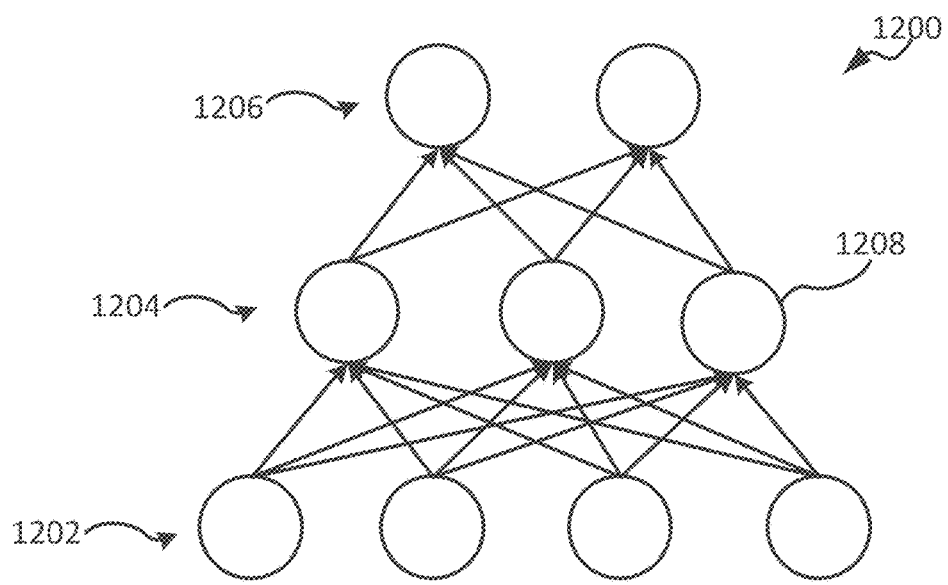
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13A:
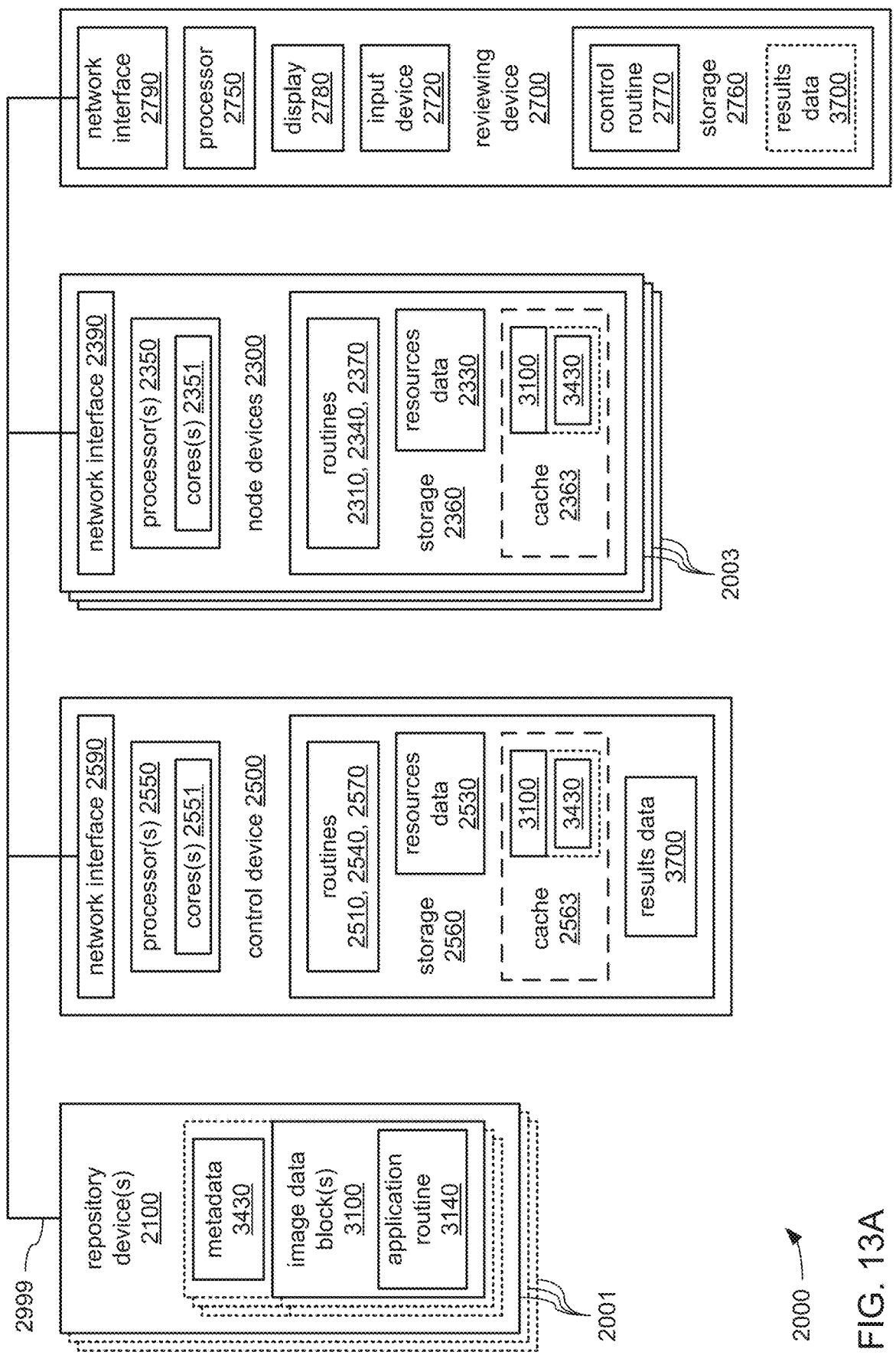
FIGS. 13A and 13B each illustrate a different example embodiment of a distributed processing system.
Figure 13B:
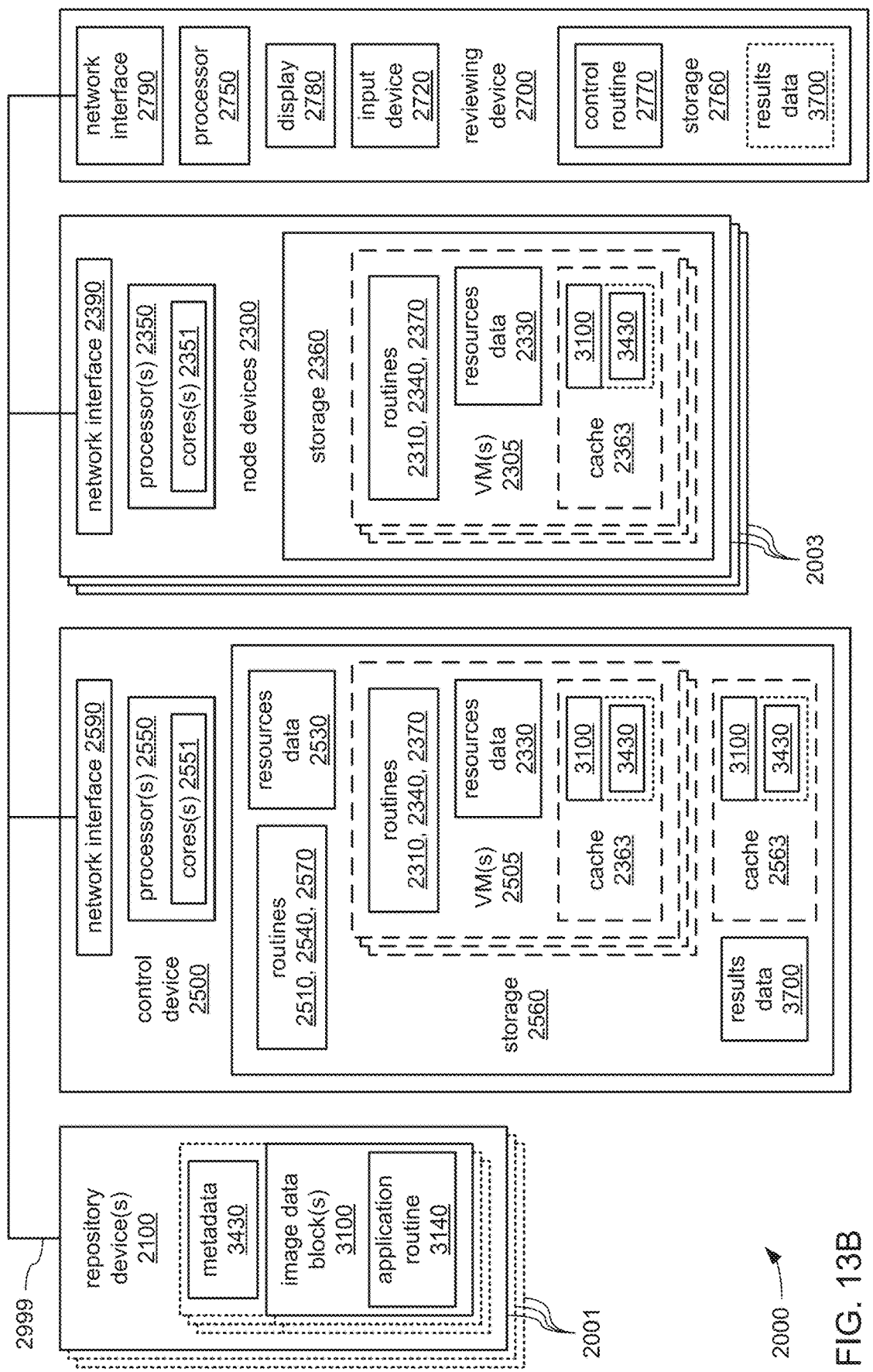
Figure 14A:
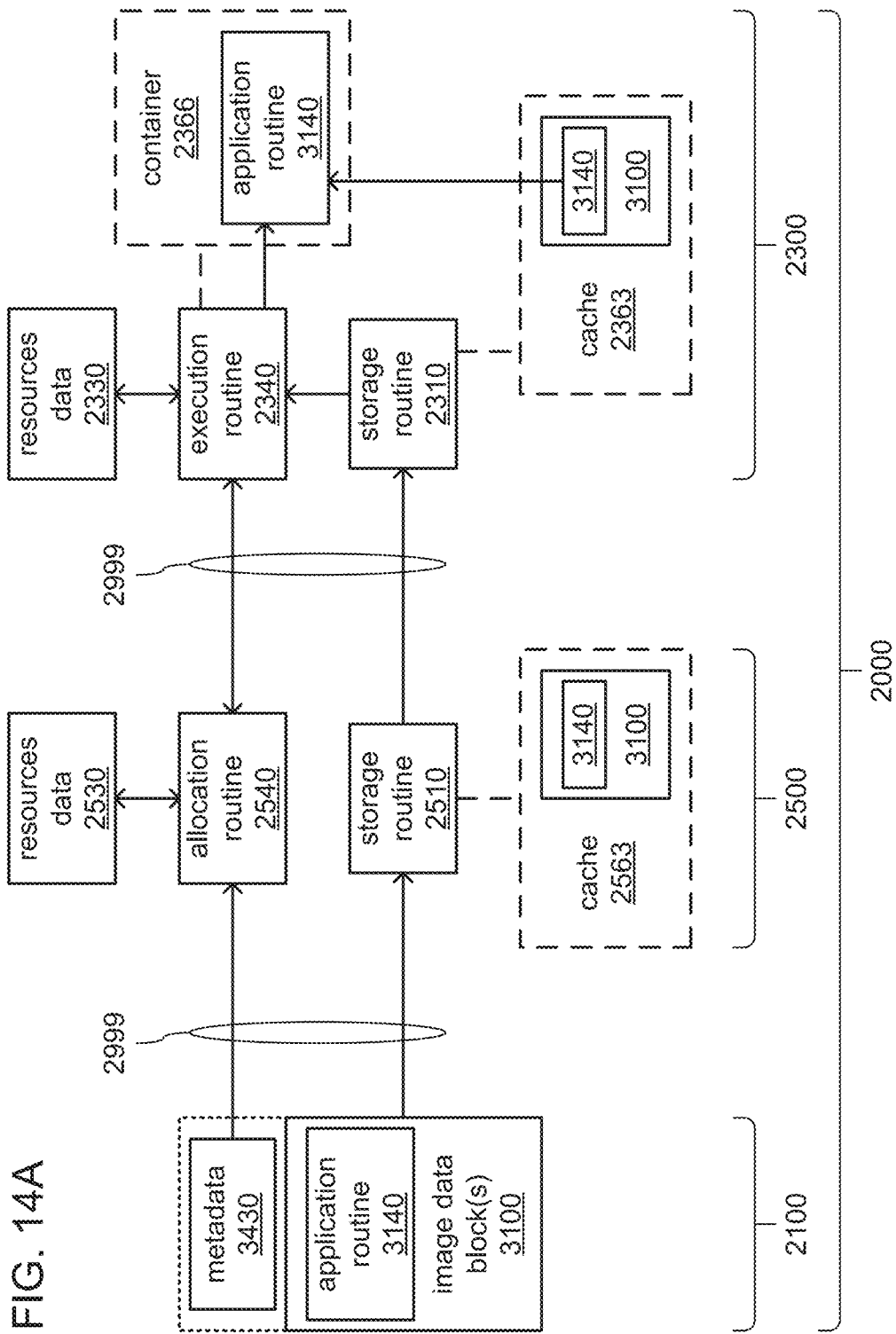
FIGS. 14A and 14B, together, illustrate an overview of an example of operating either of the example embodiments of the distributed processing system of either of FIG. 13A or 13B.
Figure 14B:
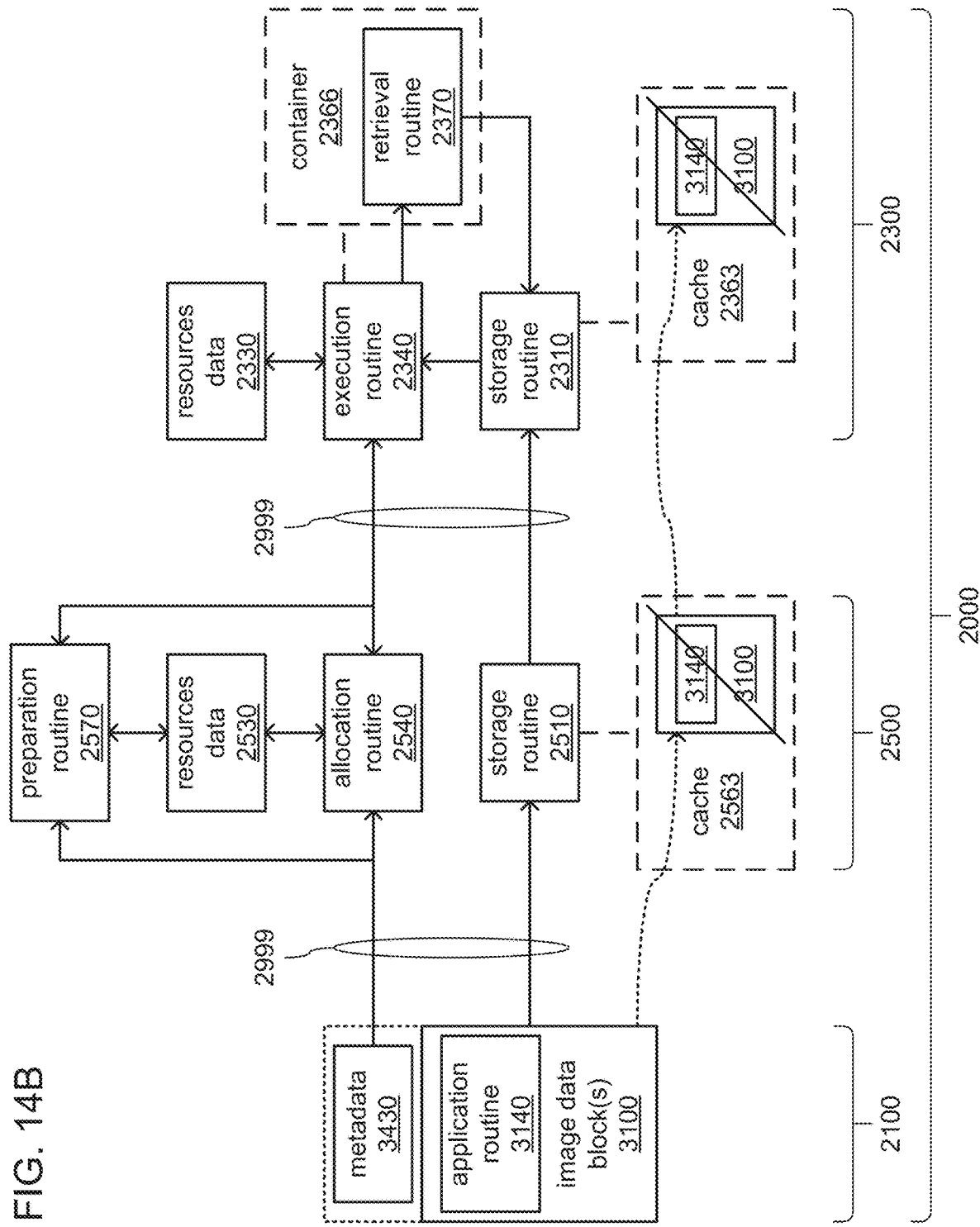

FIGS. 13A and 13B illustrate two different example embodiments of a distributed processing system 2000, and FIGS. 14A and 14B, together, illustrate an example of the operation of either of these embodiments of the processing system 2000. More specifically, FIG. 13A illustrates a block diagram of an example embodiment of a distributed processing system 2000 incorporating one or more repository devices 2100 that may form a repository grid 2001, one or more node devices 2300 that may form a node device grid 2003, at least one control device 2500, and/or at least one requesting device 2700 coupled by a network 2999. FIG. 13B illustrates a block diagram of an alternate example embodiment of a distributed processing system 2000 in which the control device 2500 and/or one or more of the node devices 2300 may incorporate multiple virtual machines (VMs) 2505 and/or 2305, respectively, that such that one or more computing devices may incorporate multiple virtual instances of node device. FIG. 14A illustrates aspects of operating embodiments of the distributed processing system 2000 of either FIG. 13A or 13B to allocate resources for the execution of an application routine 3140 through the allocation of at least one container 2366 within a node device 2300, or within a virtual node based on one of the VMs 2305 or 2505. FIG. 14B illustrates aspects of operating embodiments of the processing system 2000 of either FIG. 13A or 13B to perform a pre-pulling of an image data block 3100 that includes an image of the application routine 3140 of FIG. 14A (or another routine required to support the execution of that application routine 3140) from the one or more repository devices 2100 to enable the pre-pulled routine to already be stored within the particular node device 2300, or VM 2305 or 2505, to support the execution of the application routine 3140 in FIG. 14A.

Turning to FIG. 13A, the repository devices 2100 may each be any of a variety of devices (or may include a set of any of a variety of devices) that may store one or more image data blocks 3100 that include a copy of an application routine 3140 and/or copies of other executable routine(s) that may be needed to support the execution of an application routine 3140. As also depicted, each image data block 3100 may be stored alongside corresponding metadata 3430 containing information concerning the corresponding image data block 3100 and/or is contents. As further depicted, in various embodiments, each image data block 3100 may directly incorporate its corresponding metadata 3430. The one or more of the repository devices 2100 may include one or more storage devices operated by a commercial, academic or governmental entity that may provide online access to such routines incorporated into such image data blocks 3100 to enable their use by processing systems, such as the distributed processing system 2000. The one or more repository devices 2100 may serve as such a centralized repository as part of an approach to make the propagation of updates to various routines easier. More specifically, it may be that various application routines 3140 and/or various other supporting routines as may be included within various ones of the image data blocks 3100 may be updated on a frequent enough basis that it may be seen as desirable to provide new versions of image data block 3100 that incorporate such updates as soon as possible online. This may be done to enable the relatively quick and efficient detection and use of such updates in an automated manner, rather. As those skilled in the art will readily recognize, such quick uptake of updates may be especially desirable where such updates are intended to resolve errors in the executable instructions of one or more routines, and/or where such updates are intended to address security vulnerabilities in one or more routines.

Each application routine 3140 that is to be executed may perform any of a wide variety of functions involving any of a wide variety of types of data. Thus, the execution of each application routine 3140 may bring about the performances of any of a wide variety of tasks and/or combinations of tasks, including and not limited to searches for one or more particular data items, and/or statistical analyses such as aggregation, identifying and quantifying trends, subsampling, calculating values that characterize at least a subset of data items within a data object, deriving models, testing hypothesis with such derived models, making predictions, generating simulated samples, etc. The tasks that may be performed may also include any of a variety of data transformation tasks, including and not limited to, sorting operations, row and/or column-based mathematical operations, filtering of rows and/or columns based on the values of data items within a specified row or column, and/or reordering of at least a specified subset of data items within a data object into a specified ascending, descending or other order. Alternatively or additionally, the tasks may include any of a variety of data normalization tasks, including and not limited to, normalizing time values, date values, monetary values, character spacing, use of delimiter characters and/or codes, and/or other aspects of formatting employed in representing data items within one or more data objects. The tasks performed may also include, and are not limited to, normalizing use of big or little Endian encoding of binary values, use or lack of use of sign bits, the quantity of bits to be employed in representations of integers and/or floating point values (e.g., bytes, words, doublewords or quadwords), etc. Also alternatively or additionally, the tasks that may be performed may include tasks to train one or more neural networks for use, tasks to test one or more trained neural networks, tasks to coordinate a transition to the use of one or more trained neural networks to perform an analysis from the use of a non-neuromorphic approach to performing the analysis, and/or tasks to store, retrieve and/or deploy a data set that specifies parameters and/or hyper parameters of one or more neural networks. By way of example, such tasks may include tasks to train, test, and/or coordinate a transition to using, an ensemble of neural networks such as a chain of neural networks.

Regardless of the exact nature of the tasks that are caused to be performed via the execution of each of the application routines 3140, as will be familiar to those skilled in the art, ones of the application routines 3140 that perform relatively complex combinations of tasks may be of considerable size such that there may be a notable difference in speed and/or efficiency of execution between having an application routine 3140 stored locally within the computing device in which it is executed, and having that same application routine 3140 stored within another device that must be accessed across a network. Alternatively or additionally, it may be that the execution of a particular application routine 3140 requires the execution of one or more other supporting routines (not specifically shown) along with that application routine 3140. Such other supporting routine(s) may include libraries of executable routines for the performance of various specialized analyses, and/or executable routines to enable access to various specialized processing and/or input/output devices (e.g., device drivers to support the use of specialized processing components, such as a GPU).

As will be explained in greater detail, the repository device(s) 2100, the node device(s) 2300, the control device 2500 and/or the requesting device 2700 may cooperate through the network 2999 to execute a dynamically changing combination of multiple application routines 3140 in parallel. In so doing, a combination of dynamic allocation of resources through the dynamic allocation containers 2366 and pre-pulling of routines may be used to increase the speed and/or efficiency with which such parallel executions of application routines 3140 are performed.

In various embodiments, the network 2999 may be a single network that may extend within a single building or other relatively limited area, may be a combination of connected networks that may extend a considerable distance (e.g., include the Internet), and/or may include the Internet of Things as well as the use or employment of acoustic and non-acoustic measures (or combination). Thus, the network 2999 may be based on any of a variety (or combination) of non-acoustic communications technologies by which communications may be effected, including without limitation, wired technologies employing electrically and/or optically conductive cabling, and wireless technologies employing infrared, laser, radio frequency (RF) or other forms of wireless transmission and/or reception employing passive and/or active techniques. Alternatively or additionally, the communications technologies employed may include acoustic conductance through one or more forms of gaseous, liquid and/or solid media.

In various embodiments, each of the multiple node devices 2300 may incorporate one or more processors 2350, a storage 2360, and/or a network interface 2390 to couple each of the node devices 2300 to the network 2999. The processor(s) 2350 may incorporate multiple processing cores 2351 and/or other features to support the execution of multiple executable routines and/or multiple instances of executable routine(s) across multiple execution threads. The storage 2360 may store control routines 2310, 2340 and/or 2370; and/or resources data 2330. Additionally a portion of the storage 2360 may be allocated to provide storage space for a cache 2363. Each of the control routines 2310, 2340 and 2370 may incorporate a sequence of instructions operative on the processor(s) 2350 to implement logic to perform various functions.

In various embodiments, the control device 2500 may incorporate one or more processors 2550, a storage 2560, and/or a network interface 2590 to couple the control device 2500 to the network 2999. The processor(s) 2550 may incorporate multiple processing cores 2551 and/or other features to support the execution of multiple executable routines and/or multiple instances of executable routine(s) across multiple execution threads. The storage 2560 may store control routines 2510, 2540 and/or 2570; resources data 2530 and/or results data 3700. Additionally, a portion of the storage 2560 may be allocated to provide storage space for a cache 2563. Each of the control routines 2510, 2540 and 2570 may incorporate a sequence of instructions operative on the processor(s) 2550 to implement logic to perform various functions.

In various embodiments, the requesting device 2700 may incorporate one or more processors 2750, a storage 2760, an input device 2720, a display 2780, and/or a network interface 2790 to couple the requesting device 2700 to the network 2999. The storage 2760 may store a control routine 2770 and/or the results data 3700.

Turning to FIG. 14A, in addition to FIG. 13A, the one or more repository devices 2100, a node device 2300, the control device 2500 and/or the requesting device 2700 may cooperate through the network 2999 to cause at least a portion of an application routine 3140 to be executed within a container 2366.

In executing the storage routine 2510, processor(s) 2550 of the control device 2500 may be caused to maintain a cache 2563 in which copies of various objects (e.g., routines and/or portions of data, such as the depicted image data block 3100) may be maintained that have been received from other devices via the network 2999, that have been generated and/or modified within the control device 2500, and/or that have been transmitted via the network 2999 to other devices. The cache 2563 may be maintained within a portion of the storage 2560 that may be implemented with volatile and/or non-volatile storage device(s). It is envisioned that the cache 2563 may be employed to store at least one or more image data block(s) 3100 that each include at least one executable routine of considerable size (e.g., many megabytes in size or multiple gigabytes in size) such that it may be deemed preferable to incur the continuous consumption of storage resources for storing such image data blocks 3100 within the cache 2563, rather than to incur repeated instances of having to retrieve such image data blocks 3100 from other devices (e.g., from the one or more repository devices 2100) via the network 2999, which would repeatedly impose considerable delay in beginning the execution of application routines 3140.

Correspondingly, within each one of the node devices 2300, in executing the storage routine 2310, processor(s) 2350 thereof may be caused to maintain a cache 2363 in which copies of various objects (e.g., routines and/or portions of data, such as the depicted image data block 3100) may be maintained that have been received from other devices via the network 2999, that have been generated and/or modified within that node device 2300, and/or that have been transmitted via the network 2999 to other devices.

In executing the allocation routine 2540, processor(s) 2550 of the control device 2500 may be caused to control the allocation of containers 2366 within the node devices 2300. As previously discussed, this may be done as an approach to dynamically controlling the allocation of resources that are provided across multiple ones of the node devices 2300 for the execution of multiple application routines 3140 in parallel across the distributed processing system 2000. In so doing, the processor(s) 2550 may be caused to maintain ongoing communications with each of the node devices 2300 via the network 2999 so as to be provided with recurringly updated indications from each node device 2300 of what resources are currently available and/or are currently being consumed within each. Such recurringly updated indications may be stored within the resources data 2530 within the control device 2500, and may be recurringly referred to as part of identifying opportunities in which sufficient resources needed for the execution of at least a portion of an application routine 3140 have become available within one of the node devices 2300.

Additionally, in response to such identification of such an opportunity, processor(s) 2550 of the control device 2500 may be caused to convey instructions to that node device 2300 via the network to proceed with instantiating a container 2366 within which that application routine 3140 (or at least a portion thereof) is to be executed within that node device 2300. The processor(s) 2550 may then be caused to monitor for indications received from that node device 2300 concerning whether such execution was successfully carried out or ended with some form of failure.

Correspondingly, within each of the node devices 2300, in executing the execution routine 2340, processor(s) 2350 thereof may be caused to monitor the current availability and/or current consumption of the various resources provided within the node device 2300, and may store and recurringly update indications of such resource availability and/or consumption within a corresponding instance of the resources data 2330. The processor(s) 2350 may also be caused to cooperate via the network 2999 with the control device 2500 to recurringly relay such updated indications to the control device 2500 for storage within the resources data 2530 therein, and/or for use in the aforementioned identification of opportunities for the execution of at least a portion of an application routine 3140. The processor(s) 2350 may be further caused to identify what image data block(s) 3140 may currently be stored within the cache 2363, and may include an indication thereof in the resources data 2330 and/or in the indications recurringly relayed to the control device 2500.

Additionally, where instructions are received from the control device 2500 via the network 2999 to proceed with instantiating a container 2366 within which at least a portion of an application routine 3140 is to be executed, further execution of the execution routine 2340 may cause processor(s) 2350 to so instantiate such a container 2366. In so doing, the processor(s) 2350 may be caused to attempt to retrieve a copy of that application routine 3140 from within a cache 2363 maintained within that same node device 2300. Presuming that an image data block 3100 that includes a copy of that application routine 3140 is present within the cache 2363 maintained within that same node device 2300, then such a copy may be loaded into the container 2366 for execution as instructed. Again, it may be that such a copy of an application routine 3140 within an image data block 3100 may be formatted and/or otherwise prepared such that the application routine 3140 may be stored within the image data block 3100 as an "image" of the application routine 3140 as it may be stored within the storage space of a container 2366 in readily executable form therein. Thus, it may be that the application routine 3140 "image" may be readily copied directly into such container storage space for immediate execution with little to no further preparation. Alternatively or additionally, the "image" that is so stored within the image data block 3100 may be of the container 2366 with the application routine 3140 already stored in an immediately executable state therein. Presuming such execution is able to be carried out without errors, the processor(s) 2350 may be further caused to transmit an indication of such successful completion of execution to the control device 2500 via the network.

Turning to FIG. 14B, in addition to FIG. 13A, as has been discussed, the ability to retrieve a copy of an application routine 3140 from within the cache 2363 maintained within one of the node devices 2300 (as just described in reference to FIG. 14A) so as to avoid incurring a delay in beginning execution arising from a need to retrieve a copy from another device may require that such a delay was incurred at an earlier time when the same application routine 3140 was previously executed within that node device 2300. Further, as will be familiar to those skilled in the art, the finite capacity of each of the caches 2363 and 2563 may lead to the eviction of image data blocks 3100 such that copies of application routines 3140 may not remain stored within the caches 2363 and 2563, indefinitely. As a result, such a delay may need to be repeatedly incurred for each application routine 3140 over time. However, such instances of having to incur such a delay may be at least mitigated (if not entirely eliminated) through the use of dynamic pre-pulling, as will now be described. Thus, the one or more repository devices 2100, a node device 2300, and/or the control device 2500 may cooperate through the network 2999 to implement such pre-pulling.

In executing the preparation routine 2570, processor(s) 2550 of the control device 2500 may be caused to perform, on an iterative basis, various analyses of various pieces of information retrieved for each iteration concerning what image data blocks 3100 are available from the one or more repository devices 2100, what image data blocks 3100 should be stored within the cache 2363 of each of the node devices 2300, and what image data blocks 3100 are actually currently stored within the cache of each of the node devices 2300. In so doing, the processor(s) 2550 of the control device 2500 may retrieve information concerning what image data blocks 3100 are currently stored within the cache 2363 of each of the node devices 2300 from the recurringly updated indications thereof that are stored within the resources data 2530. As will shortly be explained in greater detail, indications of various other aspects of each of the node devices 2300 may also be retrieved from the resources data 2530, and then used to determine what image data blocks 3100 should be stored within the cache 2363 of each of the node devices 2300. Further, the processor(s) 2550 may be caused to communicate with the one or more repository devices 2100 via the network 2999 to obtain indications of what image data blocks 3100 are currently stored within the one or more repository devices 2100 as part of identifying instances in which a new version of an image data block 3100 may have become available therefrom.

In each iteration, where such analyses lead to a determination that a particular image data block 3100 associated with the execution of a particular application routine 3140 is to be pre-pulled from the one or more repository devices 2100 for storage within the cache 2363 of a particular node device 2300, the processor(s) 2550 of the control device 2500 may be caused by further execution of the preparation routine 2570 to trigger the execution of the retrieval routine 2370 within a container 2366 within the particular node device 2300. More specifically, continued execution of the preparation routine 2570 may cause processor(s) 2550 to transmit an instruction to the particular node device 2300, via the network 2999, to execute the retrieval routine 2370 to effect the retrieval of the particular application routine 3140 by the particular node device 2300.

Just as would occur in response to a normal instruction received by the particular node device 2300 from the control device 2500 to execute the particular application routine 3140 (as earlier described in reference to FIG. 14A), execution of the execution routine 2340 within the particular node device 2300 may cause processor(s) 2350 of the particular node device 2300 to instantiate a container 2366 for the execution of the retrieval routine 2370. Upon being so executed, the retrieval routine 2370 may attempt to retrieve the particular image data block 3100 that includes a copy of the particular application routine 3140 from the cache 2363 of the particular node device 2300. However, in response to the particular image data block 3100 not being present within the cache 2363, the processor(s) 2350 of the particular node device 2300 may then be caused by ongoing execution of the storage routine 2310 to transmit a request across the network 2999 for a copy of the particular image data block 3100.

As depicted, in some embodiments, such a request may be provided to the control device 2500. In response this request, processor(s) 2550 of the control device 2500 may be caused by ongoing execution of the storage routine 2510 to attempt to retrieve the particular image data block 3100 from within the cache 2563 of the control device 2500. However, presuming that the particular image data block 3100 is not currently stored within the cache 2563, the processor(s) 2550 may be cause to relay the received request to the one or more repository devices 2100 via the network 2999. Upon receiving the particular image data block 3100 from the one or more repository devices 2100 via the network 2999, the processor(s) 2550 may then be caused to relay it to the particular node device 2300 via the network 2999. As depicted, such receipt and relaying of the particular image data block 3100 may also cause a copy thereof to be stored within the cache 2563 of the control device 2500. Similarly, upon receipt of the particular image data block 3100 by the particular node device 2300, a copy thereof may also be stored within the cache 2363 of the particular node device 2300.

It should be noted that, despite what has just been described as the relaying of such a request through the control device 2500 such that the particular image data block 3100 may be caused to also be stored within the cache 2563, other embodiments are possible in which the request for the particular image data block 3100 may, instead, be directly routed from the particular node device 2300 to the one or more repository devices 2100. Correspondingly, in such other embodiments, the particular node device 2300 may then directly receive the particular image data block 3100 from the one or more repository devices 2100, thereby resulting in its storage just within the cache 2363 of the particular node device 2300.

Regardless of whether the particular image data block 3100 is provided through the control device 2500, upon successful receipt of the particular image data block 3100 by the particular node device 2300, the processor(s) 2350 of the particular node device 2300 may be caused by continued execution of the retrieval routine 2370 to transmit, to the control device 2500 via the network 2999, an indication of having successfully received and/or stored the particular image data block 3100. Following such a transmission, execution of the retrieval routine 2370 within the container 2366 may be caused to cease, and the container 2366 may be uninstantiated. In this way, resources of the particular node device 2300 that were needed to execute the retrieval routine 2370 would cease to be consumed.

Comparing FIGS. 13A and 13B, as an alternative to the distributed processing system 2000 of FIG. 13A, it may be the case one or more of the node devices 2300 may incorporate multiple virtual machines (VMs) 2305 instantiated therein such that each of such node devices 2300 may effectively function as multiple ones of the node device 2300 in a single physical package. Alternatively or additionally, it may be that multiple VMs 2505 may be instantiated within the control device 2500. FIG. 13B also illustrates examples of two different configurations of caching in relation to VMs. Specifically, and as exemplified with the control device 2500, the multiple VMs 2505 therein may share a single one of the cache 2563. In contrast, and as exemplified with the depicted control devices 2300, each of the multiple VMs 2305 therein may incorporate its own separate cache 2363.

In embodiments in which the control device 2500 does incorporate multiple VMs 2505, it may be that one or more of the VMs 2505 may be used to serve a controlling function (as would the control device 2500 of FIG. 13A without VMs 2505), and this may be done to provide some degree of redundancy against failure. Alternatively or additionally, one or more of the VMs 2505 may be used as additional node devices. It should be noted that, in some embodiments, each of the VMs 2305 of each of one or more node devices 2300 may provide separate indications of resources provided. Also, it may be that different resources of a node device 2300 are allocated to each of multiple VMs 2305. By way of example, where such a node device incorporates a GPU or is provided with license, such resources may be allocated to just a subset of the VMs 2305.

Figure 15A:
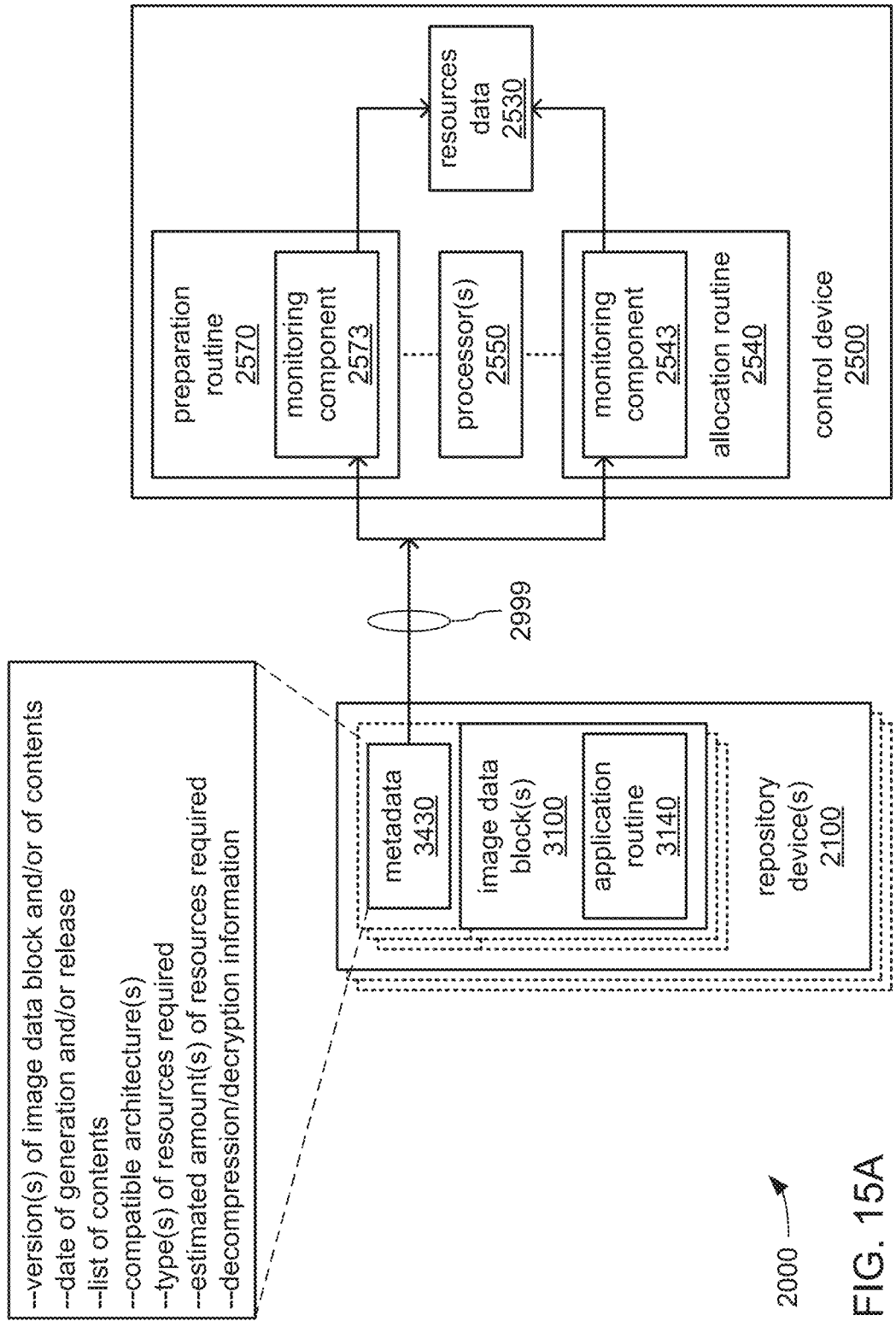
FIGS. 15A, 15B, 15C, 15D, 15E, 15F and 15G, together, illustrate an example embodiment of operation of the example embodiments of the distributed processing system of either FIG. 13A or 13B.
Figure 15B:
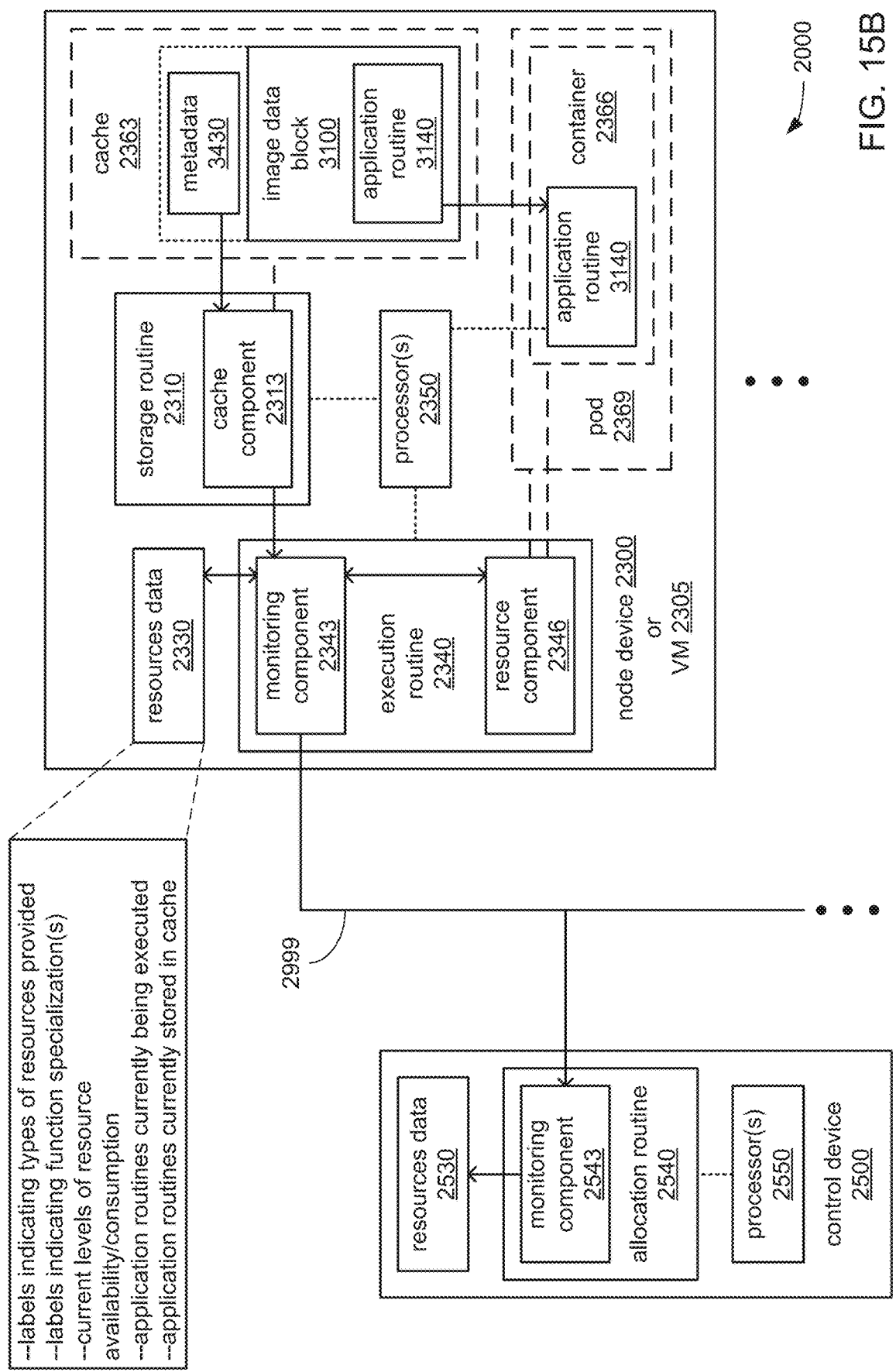
Figure 15C:
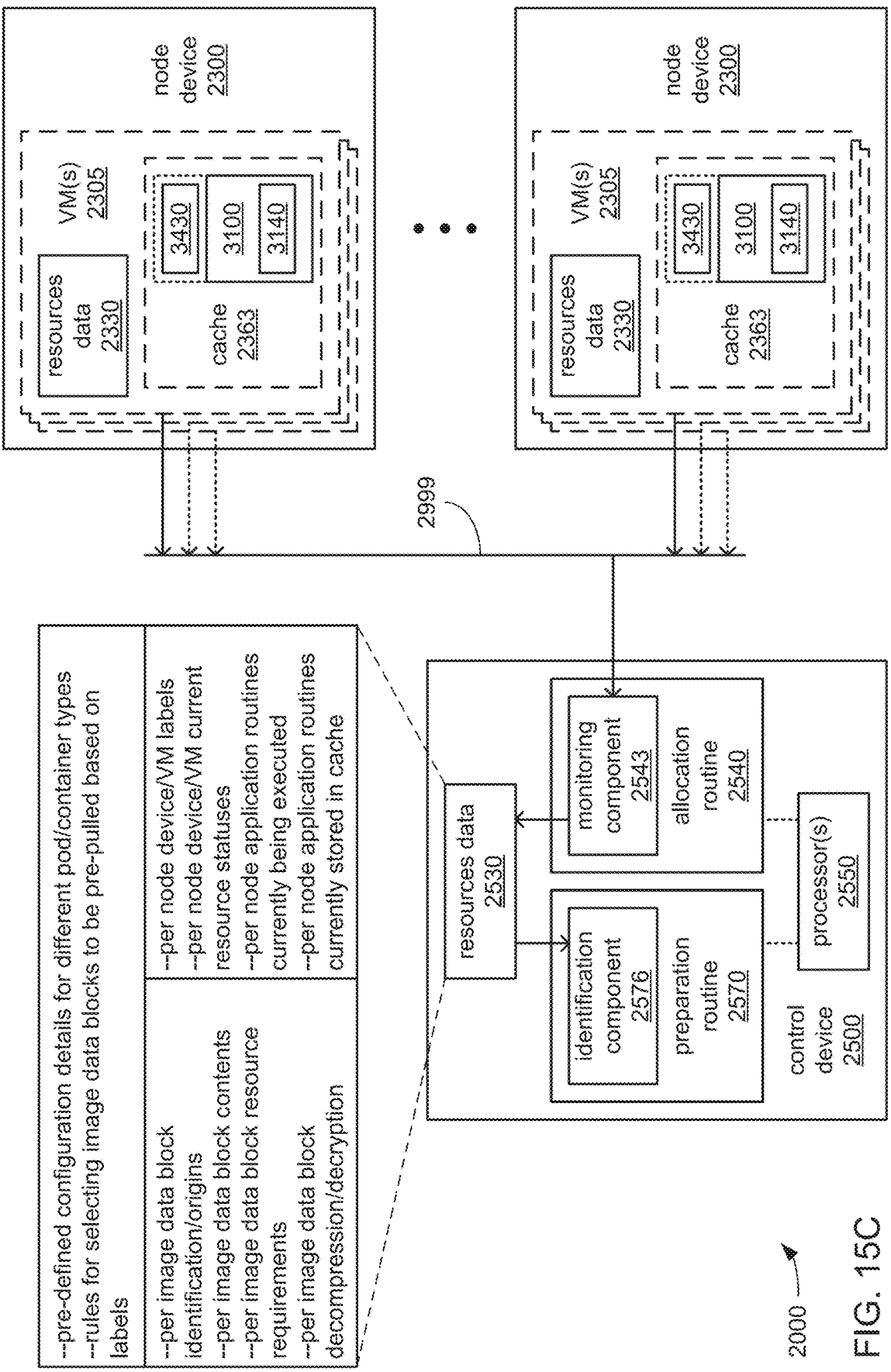
Figure 15D:
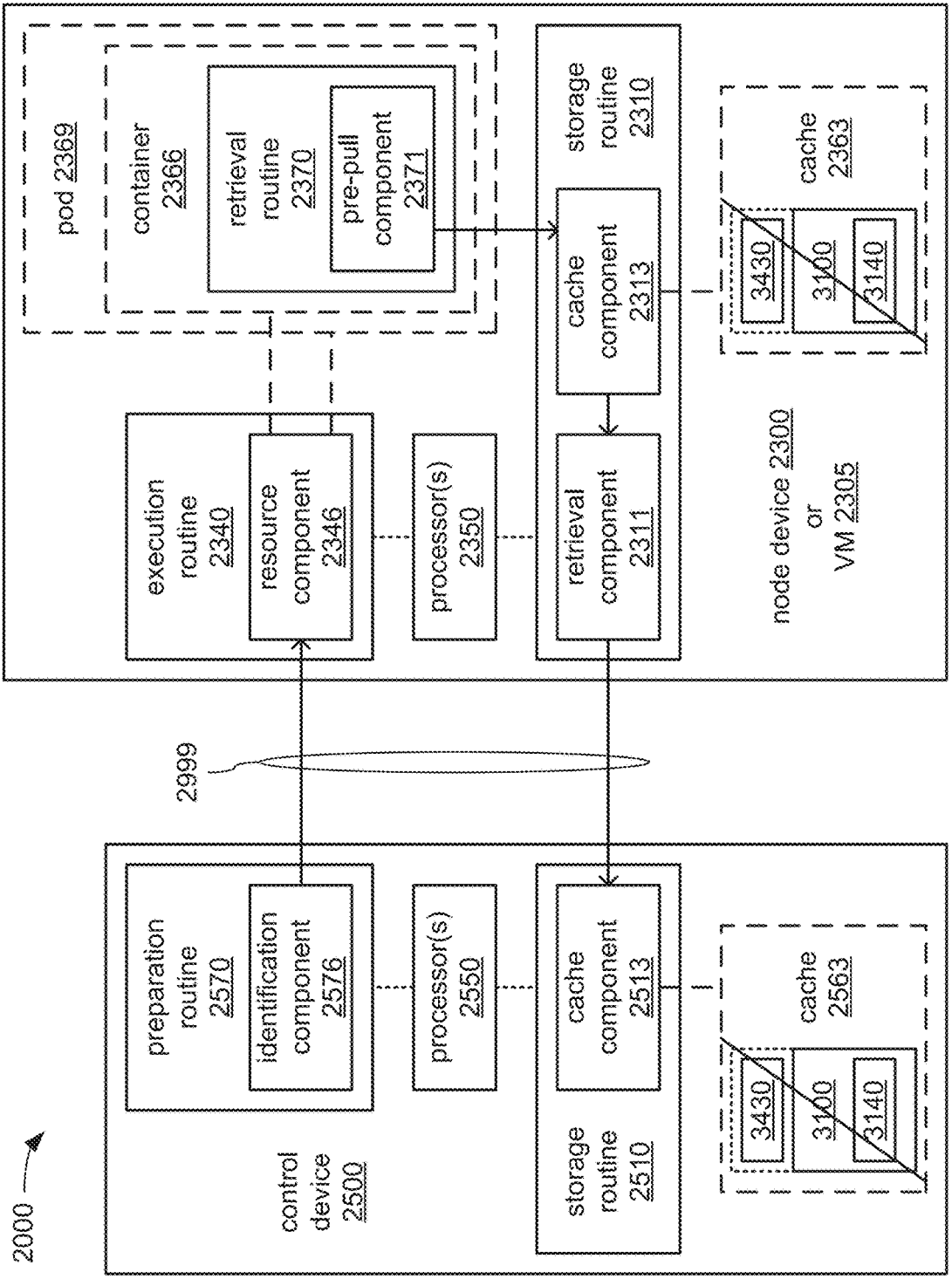
Figure 15E:
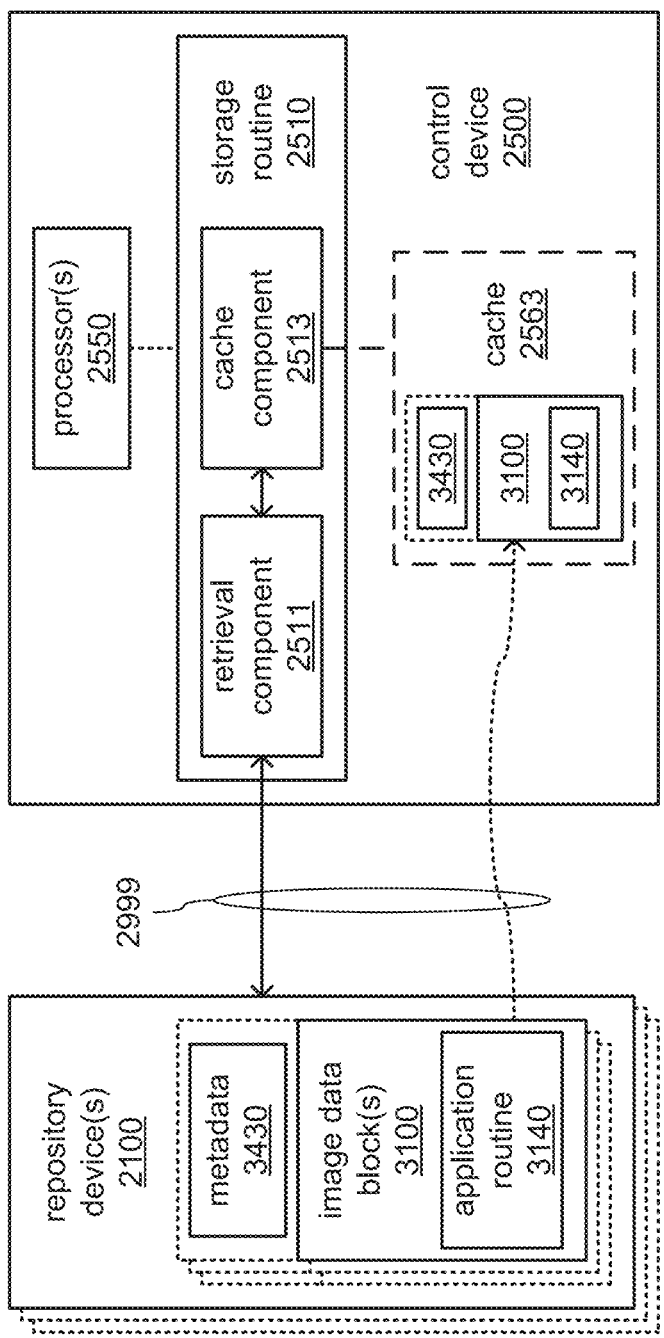
Figure 15F:
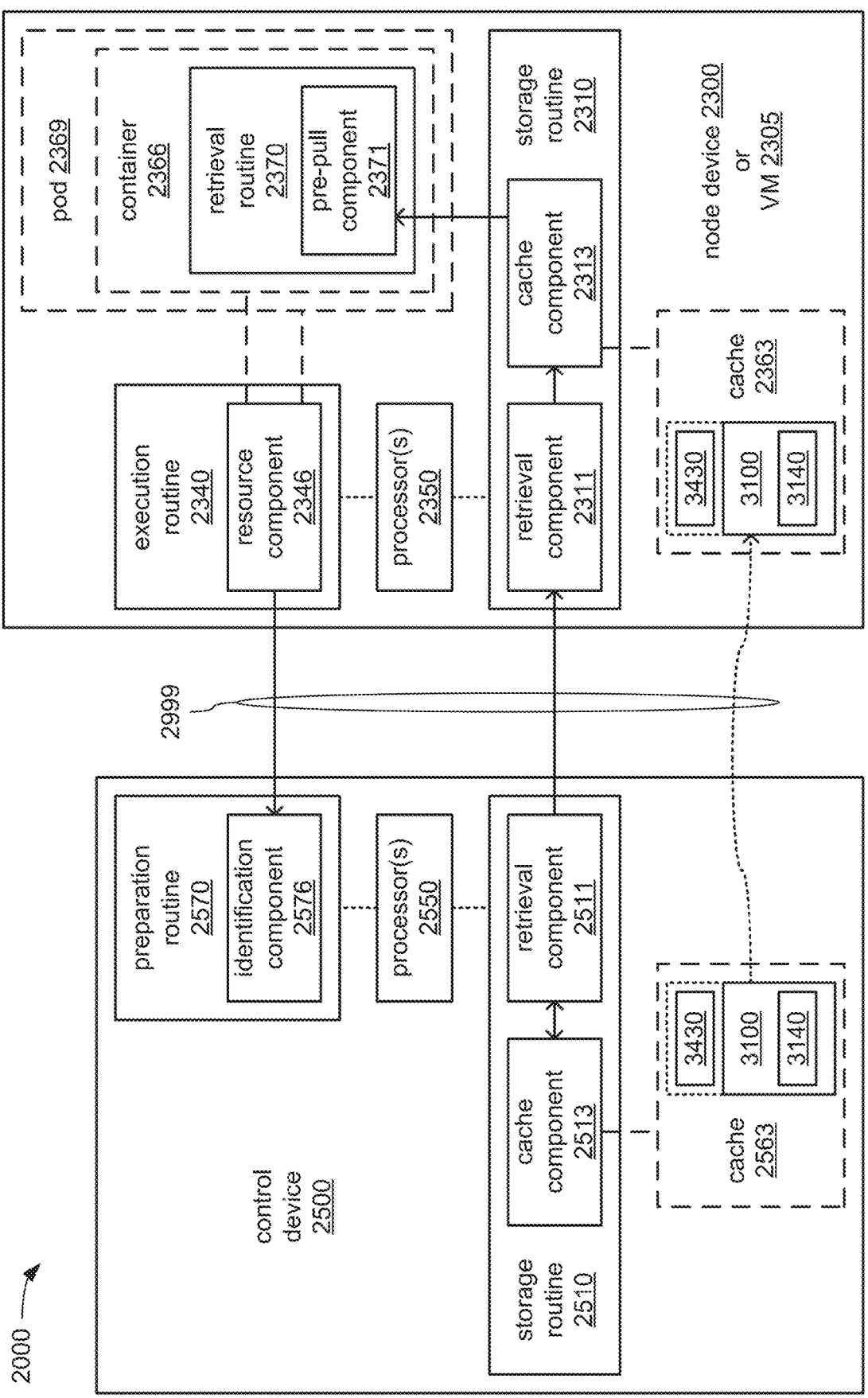
Figure 15G:
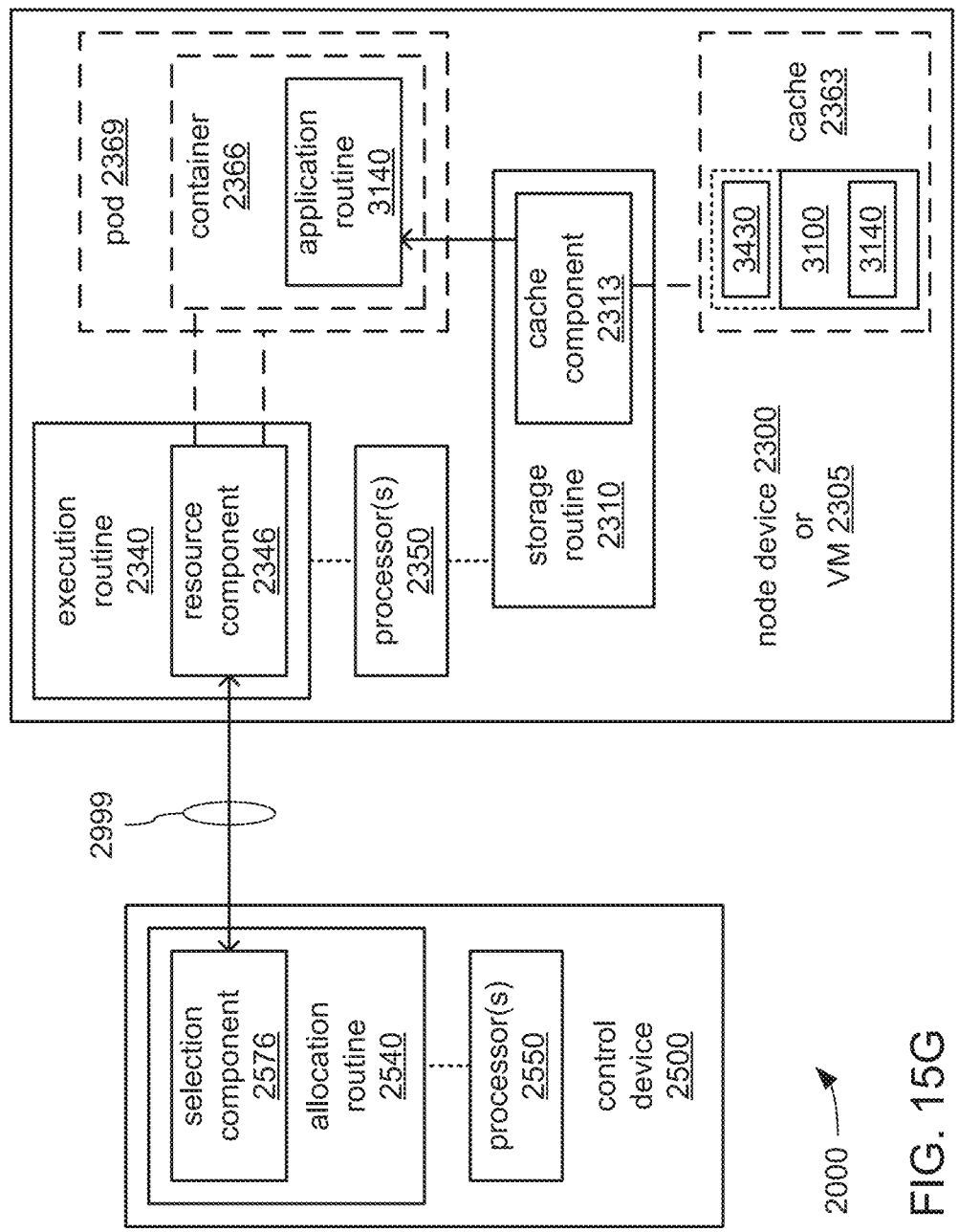

FIGS. 15A, 15B, 15C, 15D, 15E, 15F and 15G, taken together, illustrate further aspects of embodiments of the operation of embodiments of the distributed processing system 2000 of either FIG. 13A or 13B. FIGS. 15A-C, taken together, depict further aspects of gathering information needed to guide allocating resources provided by node device 2300 or VM 2305, and needed to guide pre-pulling of objects to enable the more efficient execution of application routines 3140. FIG. 15C also depicts further aspects of identifying a node device 2300 or VM 2305 in need of being provided with a copy of an object via pre-pulling. FIGS. 15D-F, taken together, depict further aspects of performing pre-pulling to provide such an identified node device 2300 or VM 2305 with a needed object from the one or more repository devices 2100. FIG. 15F also depicts further aspects of triggering such a performance of pre-pulling. FIG. 15G depicts aspects of making use of such provision of an object via pre-pulling in executing an application routine 3140.

Turning to FIGS. 15A-C, in addition to FIGS. 14A-B, as previously discussed, a resource allocation routine such as the allocation routine 2540 may recurringly collect and store a number of pieces of information concerning the provision of, requirements for, and/or consumption of, various resources by the node devices 2300 and/or VMs 2305. Such a resource allocation routine may monitor for and use updates to such information in determining where opportunities may exist to allocate resources for the execution of another application routine 3140 (or at least a portion thereof), and/or where the need may arise to undo an earlier allocation of resources as a result of consumption thereof becoming too great within a particular node device 2300 and/or VM 2305. As also previously discussed, it may be that the approach taken to effect such dynamic allocation of resources may be the dynamic instantiation and/or uninstantiation of containers 2366. Further, where the resource allocation routine that is used may be Kubernetes or another similar resource allocation routine, such instantiation and uninstantiation of containers 2366 may be carried out as part of the instantiation and uninstantiation of pods 2369 that may each include one or more containers 2366 such that related multitudes of containers 2366 that may provide multiple execution environments for multiple portions of a single application routine 3140 may be instantiated and uninstantiated, together Similarly, and as also discussed, the preparation routine 2570 may similarly recurringly collect and store information concerning the provision of, and requirements for, various resources by the node devices 2300 and/or VMs 2305. Some of such information may overlap, to at least some degree, with the information recurringly collected for use by the allocation routine 2540. Alternatively or additionally, the preparation routine 2570 may recurringly collect and store information concerning availability and/or other aspects of objects for being pre-pulled for preemptive storage within the node devices 2300 and/or VMs 2305. The preparation routine 2570 may, on a recurring interval basis, analyze such collected information to determine whether any of the node devices 2300 and/or VMs 2305 does not currently store a copy of an object, such as one of the image data blocks 3100, such that the execution of at least some application routines 3140 is able to begin more efficiently.

More specifically, as depicted in FIG. 15A, processor(s) 2550 of the control device 2500 may be caused execution of one or both of a monitoring component 2543 of the allocation routine 2540 and a monitoring component 2573 of the preparation routine 2570 to communicate with the one or more repository devices 2100 to retrieve information concerning various image data blocks 3100 stored thereat from corresponding metadata 3430. As previously discussed, the metadata 3430 that corresponds to each image data block 3100 may be directly incorporated into the corresponding image data block 3100, or may otherwise be stored along with the corresponding image data block 3100.

As depicted, the metadata 3430 that corresponds to each of the image data blocks 3100 may contain various pieces of information concerning the corresponding image data block 3100, including and not limited to, version information (e.g., an indication of revision level, and/or an indication of a variant, of the corresponding image data block 3100), date of generation and/or release (e.g., when made available online), list of contents of the corresponding image data block 3100, indication(s) of compatibility with which computer device architecture(s), type(s) of resources required, estimates of amounts of various type(s) of resources (although, as discussed earlier, this may be difficult to accurately predict), information required for decompression and/or decryption of the corresponding image data block 3100 (e.g., indication of type of compression and/or encryption used). Execution of each of the monitoring components 2543 and 2573 may cause the retrieval of differing ones of these pieces of information, and there may be some degree of overlap therebetween. As depicted, as such information is so retrieved, it may be stored as part of the resources data 2530.

It should be noted that, in some embodiments, the monitoring component 2573 of the preparation routine 2570 may be provided in addition to monitoring component 2543 of the allocation routine 2540. This may be deemed desirable to cause the retrieval and storage of pieces of information that may be needed for the pre-pulling of objects (e.g., ones of the image data blocks 3100), but that might not be needed for the allocation of containers 2366 and/or pods 2369. Thus, the monitoring component 2573 may cause the collection of such additional pieces of information that may otherwise be caused to be neglected by the monitoring component 2543.

As depicted in FIG. 15B, it may be that processor(s) 2550 of the control device 2500 are caused to collect information from the node devices 2300 and/or VMs 2305 by just the monitoring component 2543 of the allocation routine 2540. As previously discussed, it may be that information collected and stored within the resources data 2330 within each node device 2300 and/or VM 2305 may be recurringly transmitted to the control device 2500 via the network 2999. More specifically, processor(s) 2350 of a node device 2300 or VM 2305 may be caused by execution of a cache component 2313 of the storage routine 2310 to maintain the cache 2363 thereat, where one or more image data blocks 3100 may be among the objects that may be stored therein as a result of having been recently received at, generated within, or transmitted from that node device 2300 or VM 2305. In parallel with such execution of the cache component 2313, execution of a resource component 2346 of the execution routine 2340 may cause the processor(s) 2350 to instantiate a container 2366 within which an application routine 3140 that may have been retrieved from the cache 2363 may be executed. Further, in embodiments in which the allocation routine 2540 within the control device 2500 is an implementation of Kubernetes or another similar resource allocation routine, the corresponding implementation of the resource component 2346 may instantiate one or more of the container 2366 within a pod 2369.

Along with performing these aforedescribed operations to support and effectuate the execution of an application routine 3140, the processor(s) 2350 may also execute a monitoring component 2343, thereby causing the processor(s) 2350 to collect various pieces of information for storage within the resources data 2330, as well as for being recurringly transmitted via the network 2999 to the control device 2100. As depicted, the resources data 2330 for each node device 2300 or VM 2305 may contain various labels that may be pre-assigned to a node device 2300 or VM 2305, including and not limited to, labels that indicate what resources are provided within a node device 2300 or VM 2305, any special features or resources that are provided (e.g., a GPU, solid state drive array storage, etc.), and/or any specializations and/or imposed limitations concerning the functions that may be performed within a node device 2300 or VM 2305 (e.g., specializations and/or limitations concerning what application routines 3140 may be executed based on such factors as licensing contracts, etc.). As also depicted, the resources data 2330 for each node device 2300 or VM 2305, may contain other pieces of information, including and not limited to, current levels availability and/or consumption of each resource that is provided by the node device 2300 or VM 2305, identifiers of what application routines 3140 are currently being executed within the node device 2300 or VM 2305, and/or what application routines (or other supporting routines, such as libraries, etc.) are currently stored within the cache 2363.

As depicted in FIG. 15C, such gathering and storage of such numerous pieces of information at the control device 2500 may cause the resources data 2530 to store sufficient information as to enable the formation of a considerably comprehensive picture of the state of execution of multiple application routines 3140 throughout the distributed processing system 2000. As also depicted, one or more of the node devices 2300 may have multiple VMs 2305 instantiated therein, and the control device 2500 may received separate pieces of information from separate instances of the resources data 2330 for each of the VMs 2305.

As additionally depicted, in addition to such information as may be gathered for each image data block 3100, each node device 2300 and/or each VM 2305, as has been described, it may be that the resources data 2530 also includes pre-defined configuration details for each type of container 2366 and/or pod 2369 that may be instantiated (e.g., execution support features, access permissions, etc.). Alternatively or additionally, the resources data 2530 may include indications of rules that may be employed in identifying opportunities to allocate resources to execute a task routine 3140 (or portion thereof), and/or that may be employed in identifying instances in which an object needs to be pre-pulled for storage within a node device 2300 or VM 2305.

By way of example, among the rules that may be stored within the resources data 2530 for identifying situations in which pre-pulling is needed may be a rule identifying a type of application routine 3140 (or other supporting routine and/or data) that is to be pre-pulled and stored within the cache 2363 of each node device 2300 or VM 2305 that is given a label specifying a type of processing that is reserved to be performed within that node device 2300 or VM 2305. More specifically, it may be that a pre-selected subset of the node devices 2300 and/or VMs 2305 of an embodiment of the distributed processing system 2000 is reserved for performing processing operations of a particular type (e.g., as a result of being equipped with a specialized processing resource, such as a GPU) and/or processing operations requiring access to particular data sets that may be subject to particular licensing restrictions (e.g., a license controlling the number of instances of a particular application routine 3140 that may be executed in parallel, and/or privacy statutes restricting access to patient medical records, etc.). As a result, there may be one or more particular image data blocks 3100 that are to be provided to just node devices 2300 and/or VMs 2305 that are assigned a specific label (or one of a limited set of specific labels), such that it's just those particular node devices 2300 and/or VMs 2305 that are to be provided with pre-pulled copies of those one or more particular image data blocks 3100 for preemptive storage in the caches 2363 thereof.

By way of a specific example, it may be that a particular node device 2300 has been assigned to execute application routines 3140 that are written in a particular programming language and/or that require the processor(s) 2300 of a node device to support a particular version of an instruction set. Thus, the particular node device 2300 may be assigned with a label indicative of being reserved for the execution of such application routines 3140. As a result, one or more of the rules stored within the resources data 2530 may require that a copy of a particular compiler or interpreter be maintained within the cache 2363 of that particular node device 2300. Also as a result, pre-pulling of an image data block 3100 that includes a copy of that compiler or interpreter, or that includes copies of such application routines 3140, may be caused to be pre-pulled and preemptively stored within that cache 2363 when not already stored therein.

By way of another specific example, it may be that a particular node device 2300 has been specially equipped with a neuromorphic device (not specifically shown) that is configurable to implement various neural networks using hardware-based neurons. It may also be that the particular node device 2300 has been designated as implementing a particular type of neural network that must be programmed into the neuromorphic device. Thus, the particular node device 2300 may be assigned one or more labels as being the node device 2300 that is equipped with a hardware-based implementation of that particular type of neural network. As a result, one or more of the rules stored within the resources data 2530 may require that a copy of a particular neural configuration data set be maintained within the cache 2363 of that particular node device 2300 for use in programming the neuromorphic device to implement the particular type of neural network. Also as a result, pre-pulling of an image data block 3100 that includes a copy of that particular neural configuration data, or that includes a copy of a device programming routine to configure the neuromorphic device with that neural configuration data, may be caused to be pre-pulled and preemptively stored within the cache 2363 of that particular node device 2300 when not already stored therein.

By way of another more general example, among the rules that may be stored within the resources data 2350 may be a more general rule that the revision level of each application routine 3140 (or other supporting routine) stored within the cache 2363 of each node device 2300 or VM 2305 should be updated whenever a newer revision is made available on the network 2999 by the one or more repository devices 2100. Thus, for example, as a new revision level of a particular application routine 3140 is made available from the one or more repository devices 2100, that new revision level may be pre-pulled and provided to each of the node devices 2300 and/or VMs 2305 that are, according to the rules, to maintain a copy of that particular application routine 3140 within the cache 2363 thereof.

Execution of an identification component 2576 by processor(s) 2550 of the control device 2500 may cause a checks to be made, at a recurring interval of time, of whether a situation has arisen in which such rules require the pre-pulling of an image data block 3100 for being preemptively provided to a node device 2300 or VM 2305 for storage within its cache 2363. In some embodiments, at the start of each such interval, the checks that may be performed on a per-label basis such that, for each label, each node device 2300 and/or VM 2305 that has been assigned that label may have their cache 2363 checked to determine whether the one or more image data blocks 3100 that should be stored therein as a result of being assigned that label are so stored, and a check may be performed to confirm that those one or more image data blocks are up-to-date when compared to their counterparts provided by the one or more repository devices 2100.

Turning to FIGS. 15D-15G, in addition to FIGS. 14A-B, as previously discussed, where a node device 2300 or VM 2305 is identified as needing to be preemptively provided with a copy of an image data block 3100 that includes a particular application routine 3140, or other supporting routine, processor(s) of that particular node device 2300 or VM 2305 may be caused to trigger the pre-pulling of that particular image data block 3100 from the one or more repository devices 2100 via the network 2999. More specifically, as depicted in FIG. 15D, in continuing to execute the identification component 2576, processor(s) 2550 of the control device 2500 may be caused to transmit an instruction to the particular node device 2300 or VM 2305 to execute the retrieval routine 2370 to cause pre-pulling of the particular image data block 3100 for storage within the cache 2363. Within the particular node device 2300 or VM 2305, execution of the resource component 2346 of the execution routine 2340 may cause processor(s) 2350 of the particular node device 2300 or VM 2305 to instantiate a container 2366 and/or a pod 2369 in which a pre-pull component 2371 of the retrieval routine 2370 is executed by the processor(s) 2350.

In so executing the pre-pull component 2371, a request may be made to the storage routine 2310 that maintains the cache 2363 to provide a copy of the particular image data block 3100. In response to that request, and in executing a cache component 2313 of the storage routine 2310, the processor(s) 2350 may be caused to search for the particular image data block 3100 within the cache 2363. Upon not finding the particular image data block 3100 therein, execution of a retrieval component 2311 of the storage routine 2310 may cause the processor(s) 2350 to transmit a request to the control device 2500 for a copy of that particular image data block 3100. Within the control device 2500, in executing a cache component 2513 of the storage routine 2510, processor(s) 2550 of the control device 2500 may be caused to search for the particular image data block 3100 within the cache 2563.

As depicted in FIG. 15E, upon not finding the particular image data block 3100 within the cache 2563 of the control device 2500, execution of a retrieval component 2511 of the storage routine 2510 may cause the processor(s) 2550 to transmit a request to the one or more repository devices 2100 to provide a copy of that particular image data block 3100 via the network 2999.

As depicted in FIG. 15F, upon receiving the particular image data block 3100 from the one or more repository devices 2100 via the network 2999, ongoing execution of the cache component 2513 may cause the processor(s) 2550 to store a copy thereof within the cache 2563. Also, further execution of the retrieval component 2511 may cause the particular image data block 3100 to be relayed onward via the network 2999 to the particular node device 2300 or VM 2305.

Within the particular node device 2300 or VM 2305, upon receiving the particular image data block 3100 from the control device 2500 via the network 2999, ongoing execution of the cache component 2313 may cause the processor(s) 2350 to store a copy thereof within the cache 2363. Also, the pre-pull component 2371 may be provided with an indication that the pre-pulling of the particular image data block 3100 has been successful. Execution of the retrieval routine 2370 may then cease, and correspondingly, the container 2366 and/or the pod 2369 in which the retrieval routine 2370 was being executed may be uninstantiated by the processor(s) 2350 as a result of ongoing execution of the resource component 2346 of the execution routine 2340. The processor(s) 2350 may also be caused to transmit an indication back to the control device 2500 that the pre-pulling of the particular image data block 3100 has been successfully completed.

However, if instead of being successfully completed, the pre-pulling of the particular image data block 3100 had ended in a failure, then the processor(s) 2550 of the control device 2500 may be caused by the identification component 2576 to take differing actions depending on such factors a time. More specifically, if an indication of failure in the pre-pulling is received early enough in the current interval of time, then the processor(s) 2550 may be caused by the identification component 2576 to re-transmit the instruction to the particular node device 2300 or VM 230*t* to perform the pre-pulling of the particular image data block 3100. However, if no indication of failure in the pre-pulling is ever received during the current interval or is received late in the current interval of time, then the processor(s) 2550 may be caused to forego any further attempt at the pre-pulling during the current interval, and instead, both the check for whether the pre-pulling of the particular image data block 3100 is needed, and a possible new attempt to perform the pre-pulling may be delayed and left for the next interval of time.

As depicted in FIG. 15G, presuming that the pre-pulling of the particular image data block 3100 was successful, then the particular application routine 3140 therein becomes available for being retrieved from the cache 2363 for being executed the next time that instructions are received from the control device 2500 to so executed it. More specifically, at a time following such successful pre-pulling, execution of instructions of a selection component 2576 of the allocation routine 2540 may cause processor(s) 2550 to identify an opportunity to execute the particular application routine 3140 within the particular node device 2300 or VM 2305. The processor(s) 2550 may then be caused to act on that opportunity by transmitting an instruction to the particular node device 2300 or VM 2305 to execute the particular application routine 3140. In response, and as depicted, processor(s) 2350 of the particular node device 2300 or VM 2305 may then be caused to instantiate a container 2366 and/or pop 2369 within which a copy of the particular application routine 3140 retrieved from the cache 2363 may be so executed.

In various embodiments, each of the control routines 2310, 2340, 2370, 2510, 2540 and 2570, including the components of which each is composed, may be selected to be operative on whatever type of processor or processors that are selected to implement applicable ones of the processors 2350, 2550 and/or 2750 within each one of the devices 2300, 2500 and/or 2700, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2350, 2550 and/or 2750. Where one or more device drivers are included, those device drivers may provide support for any of a variety of other components, whether hardware or software components, of the devices 2300, 2500 and/or 2700.

In various embodiments, each of the storages 2360, 2560 and 2760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage within one or more of the data sources 2100 may be implemented with a redundant array of independent discs (RAID) of a RAID level selected to provide fault tolerant storage.

In various embodiments, each of the input device(s) 2720 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, each of the display(s) 2780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2780 may each be a touchscreen display such that the input device 2720, respectively, may be incorporated therein as touch-sensitive components thereof.

In various embodiments, each of the network interfaces 2390, 2590 and 2790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, one or more of the network interfaces 2390, 2590 and/or 2790 may be implemented with multiple copper-based or fiber-optic based network interface ports to provide redundant and/or parallel pathways in exchanging data.

In various embodiments, the division of processing and/or storage resources among the devices 2300 and/or 2500, and/or the API architectures employed to support communications among the devices 2300 and/or 2500 may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising at least one processor and a storage to store instructions that, when executed by the at least one processor, cause the at least one processor to perform pre-pulling operations at a time prior to receiving a request to execute an application routine, the pre-pulling operations comprising:
   receive, at the at least one processor and from a node device via a network:
      an indication of ability of the node device to provide a resource required to support execution of the application routine within the node device;
      at least one identifier of at least one image that is stored within a cache of the node device, and that comprises an executable routine that is required to support the execution of the application routine within the node device; and
      an indication of at least one revision level of the at least one image stored within the cache, wherein:
         portions of contents of the cache are evicted from the cache based on at least one of which portion of the contents is least recently accessed or which portion of the contents is least frequently accessed; and
         at least one portion of the contents of the cache includes the at least one image;
   analyze the indication of ability of the node device to provide the resource to determine whether the node device is able to support the execution of the application routine;
   in response to a determination that the node device is able to support the execution of the application routine, identify a first image that is stored in a repository, and that comprises an executable routine that is required to support the execution of the application routine within the node device;

compare each identifier of the at least one identifier to the identity of the first image to determine whether, among the at least one image stored in the cache of the node device, there is a second image that comprises an executable routine that matches the executable routine of the first image; and in response to a match between the identity of the first image stored in the repository and an identifier of a second image stored within the cache of the node device, the at least one processor is caused to perform operations comprising:

compare a revision level of a most recent version of the first image to a revision level of the second image; and in response to the revision level of the most recent version of the first image being more recent than the revision level of the second image, the at least one processor is caused to perform operations comprising:

retrieve the most recent version of the first image from the repository; and store the most recent version of the first image within the node device, wherein:

the storage of the most recent version of the first image within the node device triggers storage of a copy of the most recent version of the first image within the cache of the node device to enable retrieval of the executable routine of the most recent version of the first image from within the cache to support execution of the application routine within the node device in response to subsequently receiving the request to execute the application routine.

2. The apparatus of claim 1, wherein:
the indication of ability of the node device to provide the resource comprises an indication of a degree of availability of a processor of the node device to execute the application routine, and an indication of an instruction set supported by the processor of the node device; and
identifying the first image comprises identifying an image stored in the repository that comprises an executable routine that is compatible with the instruction set supported by the processor of the node device.

3. The apparatus of claim 1, wherein:
the indication of ability of the node device to provide the resource comprises an indication of whether the node device includes a graphics processing unit (GPU); and
in response to an indication that the node device includes a GPU, the at least one processor is caused to perform operations comprising:

analyze indications, from the repository, of characteristics of each image of multiple images of the application routine stored in the repository to determine whether an image of the multiple images of the application routine supports use of a GPU; and in response to a determination that an image of the multiple images of the application routine does support use of a GPU, retrieve the image of the application routine that supports use of a GPU from the repository as the first image.

4. The apparatus of claim 1, wherein:
the indication of ability of the node device to provide the resource comprises an indication of whether the node device includes a neuromorphic device that is programmable to implement a neural network; and in response to an indication that the node device includes a neuromorphic device, the at least one processor is caused to perform operations comprising:

analyze indications, from the repository, of characteristics of each image of multiple images of the application routine stored in the repository to determine whether an image of the multiple images of the application routine supports use of a neuromorphic device; and in response to a determination that an image of the multiple images of the application routine does support use of a neuromorphic device, retrieve, from the repository, at least one of:

the image of the application routine that supports use of a neuromorphic device; or an image of neural network configuration data required to configure the neuromorphic device to implement a trained neural network to support execution of the application routine.

5. The apparatus of claim 1, wherein:
the execution of the application routine within the node device requires a license to be granted that authorizes execution of the application routine within the node device;
the indication of ability of the node device to provide the resource comprises an indication of whether the node device is currently granted the license; and
the at least one processor is caused to perform operations comprising:

analyze the indication of degree of ability of the node device to provide the resource to determine if the node device is currently granted the license; and condition at least the storage of the most recent version of the first image within the node device on a determination that the node device is currently granted the license.

6. The apparatus of claim 1, wherein:
the execution of the application routine within the node device requires access to a data set;
access to the data set requires a license to be granted that assigns authority to access the data set to application routines that are executed on the node device;
the indication of ability of the node device to provide the resource comprises an indication of whether the node device is currently granted the license; and
the at least one processor is caused to perform operations comprising:

analyze the indication of degree of ability of the node device to provide the resource to determine if the node device is currently granted the license; and condition at least the storage of the most recent version of the first image within the node device on a determination that the node device is currently granted the license.

7. The apparatus of claim 1, wherein the at least one processor is caused to perform operations comprising:
receive, from the node device, an indication of specialization of the node device to restrict the node device to executing a pre-determined limited subset of types of application routines;
analyze the indication of specialization to identify a subset of multiple application routines that are among the limited subset of types of application routines, and for which images are available in the repository; and restrict the analysis of the ability of the node device to provide the resource to determine whether the node device is able to support the execution of an application to the subset of multiple application routines.

8. The apparatus of claim 1, wherein:
the node device allocates the resource by dynamically allocating multiple container environments that each consume a portion of the resource to enable execution of multiple application routines across the multiple container environments in parallel;
the resource comprises at least one of a processor of the node device or storage space within a storage of the node device; and
the first image comprises at least one of a copy of the application routine or a copy of a library routine required to support the execution of the application routine within a container environment of the multiple container environments.

9. The apparatus of claim 1, wherein:
the at least one portion of the contents of the cache comprises the second image;
the second image has been evicted from the cache in response to being least recently accessed or in response to being least frequently accessed; and
in response to a lack of match between the identity of the first image and an identifier of an image stored within the cache, the at least one processor is caused to perform operations comprising:
retrieve the most recent version of the first image from the repository; and
store the most recent version of the first image within the node device to trigger storage of a copy of the most recent version of the first image within the cache of the node device.

10. The apparatus of claim 9, wherein:
at least one of a least recently accessed image of an executable routine or a least frequently accessed image of an executable routine among the at least one image of an executable routine stored within the cache is evicted from the cache to enable storage of another image of an executable within the cache in response to the other image being currently required to execute another application routine; and
the at least one processor is caused to repeat the pre-pulling operations on a recurring interval of time.

11. A computer-program product tangibly embodied in a non-transitory machine-readable storage medium, the computer-program product including instructions operable to cause at least one processor to perform pre-pulling operations at a time prior to receiving a request to execute an application routine, the pre-pulling operations comprising:
receive, at the at least one processor and from a node device via a network:
an indication of ability of the node device to provide a resource required to support execution of the application routine within the node device;
at least one identifier of at least one image that is stored within a cache of the node device, and that comprises an executable routine that is required to support the execution of application routine within the node device; and
an indication of at least one revision level of the at least one image stored within the cache, wherein:
portions of contents of the cache are evicted from the cache based on at least one of which portion of the contents is least recently accessed or which portion of the contents is least frequently accessed; and
at least one portion of the contents of the cache includes the at least one image;
analyze the indication of ability of the node device to provide the resource to determine whether the node device is able to support the execution of the application routine;
in response to a determination that the node device is able to support the execution of the application routine, identify a first image that is stored in a repository, and that comprises an executable routine that is required to support the execution of the application routine within the node device;
compare each identifier of the at least one identifier to the identity of the first image to determine whether, among the at least one image stored in the cache of the node device, there is a second image that comprises an executable routine that matches the executable routine of the first image; and
in response to a match between the identity of the first image stored in the repository and an identifier of a second image stored within the cache of the node device, the at least one processor is caused to perform operations comprising:
compare a revision level of a most recent version of the first image to a revision level of the second image; and
in response to the revision level of the most recent version of the first image being more recent than the revision level of the second image, the at least one processor is caused to perform operations comprising:
retrieve the most recent version of the first image from the repository; and
store the most recent version of the first image within the node device, wherein:
the storage of the most recent version of the first image within the node device triggers storage of a copy of the most recent version of the first image within the cache of the node device to enable retrieval of the executable routine of the most recent version of the first image from within the cache to support execution of the application routine within the node device in response to subsequently receiving the request to execute the application routine.

12. The computer-program product of claim 11, wherein:
the indication of ability of the node device to provide the resource comprises an indication of a degree of availability of a processor of the node device to execute the application routine, and an indication of an instruction set supported by the processor of the node device; and
identifying the first image comprises identifying an image stored in the repository that comprises an executable routine that is compatible with the instruction set supported by the processor of the node device.

13. The computer-program product of claim 11, wherein:
the indication of ability of the node device to provide the resource comprises an indication of whether the node device includes a graphics processing unit (GPU); and
in response to an indication that the node device includes a GPU, the at least one processor is caused to perform operations comprising:
analyze indications, from the repository, of characteristics of each image of multiple images of the application routine stored in the repository to determine whether an image of the multiple images of the application routine supports use of a GPU; and
in response to a determination that an image of the multiple images of the application routine does support use of a GPU, retrieve the image of the application routine that supports use of a GPU from the repository as the first image.

14. The computer-program product of claim 11, wherein:
the indication of ability of the node device to provide the resource comprises an indication of whether the node device includes a neuromorphic device that is programmable to implement a neural network; and
in response to an indication that the node device includes a neuromorphic device, the at least one processor is caused to perform operations comprising:
analyze indications, from the repository, of characteristics of each image of multiple images of the application routine stored in the repository to determine whether an image of the multiple images of the application routine supports use of a neuromorphic device; and
in response to a determination that an image of the multiple images of the application routine does support use of a neuromorphic device, retrieve, from the repository, at least one of:
the image of the application routine that supports use of a neuromorphic device; or
an image of neural network configuration data required to configure the neuromorphic device to implement a trained neural network to support execution of the application routine.

15. The computer-program product of claim 11, wherein:
the execution of the application routine within the node device requires a license to be granted that authorizes execution of the application routine within the node device;
the indication of ability of the node device to provide the resource comprises an indication of whether the node device is currently granted the license; and
the at least one processor is caused to perform operations comprising:
analyze the indication of degree of ability of the node device to provide the resource to determine if the node device is currently granted the license; and
condition at least the storage of the most recent version of the first image within the node device on a determination that the node device is currently granted the license.

16. The computer-program product of claim 11, wherein:
the execution of the application routine within the node device requires access to a data set;
access to the data set requires a license to be granted that assigns authority to access the data set to application routines that are executed on the node device;
the indication of ability of the node device to provide the resource comprises an indication of whether the node device is currently granted the license; and
the at least one processor is caused to perform operations comprising:
analyze the indication of degree of ability of the node device to provide the resource to determine if the node device is currently granted the license; and
condition at least the storage of the most recent version of the first image within the node device on a determination that the node device is currently granted the license.

17. The computer-program product of claim 11, wherein the at least one processor is caused to perform operations comprising:
receive, from the node device, an indication of specialization of the node device to restrict the node device to executing a pre-determined limited subset of types of application routines;
analyze the indication of specialization to identify a subset of multiple application routines that are among the limited subset of types of application routines, and for which images are available in the repository; and
restrict the analysis of the ability of the node device to provide the resource to determine whether the node device is able to support the execution of an application to the subset of multiple application routines.

18. The computer-program product of claim 11, wherein:
the node device allocates the resource by dynamically allocating multiple container environments that each consume a portion of the resource to enable execution of multiple application routines across the multiple container environments in parallel;
the resource comprises at least one of a processor of the node device or storage space within a storage of the node device; and
the first image comprises at least one of a copy of the application routine or a copy of a library routine required to support the execution of the application routine within a container environment of the multiple container environments.

19. The computer-program product of claim 11, wherein:
the at least one portion of the contents of the cache comprises the second image;
the second image has been evicted from the cache in response to being least recently accessed or in response to being least frequently accessed; and
in response to a lack of match between the identity of the first image and an identifier of an image stored within the cache, the at least one processor is caused to perform operations comprising:
retrieve the most recent version of the first image from the repository; and
store the most recent version of the first image within the node device to trigger storage of a copy of the most recent version of the first image within the cache of the node device.

20. The computer-program product of claim 19, wherein:
at least one of a least recently accessed image of an executable routine or a least frequently accessed image of an executable routine among the at least one image of an executable routine stored within the cache is evicted from the cache to enable storage of another image of an executable within the cache in response to the other image being currently required to execute another application routine; and
the at least one processor is caused to repeat the pre-pulling operations on a recurring interval of time.

21. A computer-implemented method comprises performing pre-pulling operations at a time prior to receiving a request to execute an application routine, the pre-pulling operations comprising:
receiving, by at least one processor and from a node device via a network:
an indication of ability of the node device to provide a resource required to support execution of the application routine within the node device;
at least one identifier of at least one image that is stored within a cache of the node device, and that comprises an executable routine that is required to support the execution of application routine within the node device; and an indication of at least one revision level of the at least one image stored within the cache, wherein:

portions of contents of the cache are evicted from the cache based on at least one of which portion of the contents is least recently accessed or which portion of the contents is least frequently accessed; and at least one portion of the contents of the cache includes the at least one image;

analyzing, by the at least one processor, the indication of ability of the node device to provide the resource to determine whether the node device is able to support the execution of the application routine;

in response to a determination that the node device is able to support the execution of the application routine, identifying, by the at least one processor, a first image that is stored in a repository, and that comprises an executable routine that is required to support the execution of the application routine within the node device;

comparing each identifier of the at least one identifier to the identity of the first image to determine whether, among the at least one image stored in the cache of the node device, there is a second image that comprises an executable routine that matches the executable routine of the first image; and in response to a match between the identity of the first image stored in the repository and an identifier of a second image stored within the cache of the node device, performing operations comprising:

comparing a revision level of a most recent version of the first image to a revision level of the second image; and in response to the revision level of the most recent version of the first image being more recent than the revision level of the second image, performing operations comprising:

retrieving the most recent version of the first image from the repository; and storing the most recent version of the first image within the node device, wherein:

the storage of the most recent version of the first image within the node device triggers storage of a copy of the most recent version of the first image within the cache of the node device to enable retrieval of the executable routine of the most recent version of the first image from within the cache to support execution of the application routine within the node device in response to subsequently receiving the request to execute the application routine.

22. The computer-implemented method of claim 21, wherein:

the indication of ability of the node device to provide the resource comprises an indication of a degree of availability of a processor of the node device to execute the application routine, and an indication of an instruction set supported by the processor of the node device; and identifying the first image comprises identifying, by the at least one processor, an image stored in the repository that comprises an executable routine that is compatible with the instruction set supported by the processor of the node device.

23. The computer-implemented method of claim 21, wherein:

the indication of ability of the node device to provide the resource comprises an indication of whether the node device includes a graphics processing unit (GPU); and the method comprises, in response to an indication that the node device includes a GPU, performing operations comprising:

analyzing, by the at least one processor, indications, from the repository, of characteristics of each image of multiple images of the application routine stored in the repository to determine whether an image of the multiple images of the application routine supports use of a GPU; and in response to a determination that an image of the multiple images of the application routine does support use of a GPU, retrieving the image of the application routine that supports use of a GPU from the repository as the first image.

24. The computer-implemented method of claim 21, wherein:

the indication of ability of the node device to provide the resource comprises an indication of whether the node device includes a neuromorphic device that is programmable to implement a neural network; and the method comprises, in response to an indication that the node device includes a neuromorphic device, performing operations comprising:

analyzing, by the at least one processor, indications, from the repository, of characteristics of each image of multiple images of the application routine stored in the repository to determine whether an image of the multiple images of the application routine supports use of a neuromorphic device; and in response to a determination that an image of the multiple images of the application routine does support use of a neuromorphic device, retrieving, from the repository, at least one of:

the image of the application routine that supports use of a neuromorphic device; or an image of neural network configuration data required to configure the neuromorphic device to implement a trained neural network to support execution of the application routine.

25. The computer-implemented method of claim 21, wherein:

the execution of the application routine within the node device requires a license to be granted that authorizes execution of the application routine within the node device;

the indication of ability of the node device to provide the resource comprises an indication of whether the node device is currently granted the license; and the method comprises performing operations comprising:

analyzing, by the at least one processor, the indication of degree of ability of the node device to provide the resource to determine if the node device is currently granted the license; and conditioning, by the at least one processor, at least the storage of the most recent version of the first image within the node device on a determination that the node device is currently granted the license.

26. The computer-implemented method of claim 21, wherein:

the execution of the application routine within the node device requires access to a data set;

access to the data set requires a license to be granted that assigns authority to access the data set to application routines that are executed on the node device;

the indication of ability of the node device to provide the resource comprises an indication of whether the node device is currently granted the license; and the method comprises performing operations comprising:

analyzing, by the at least one processor, the indication of degree of ability of the node device to provide the resource to determine if the node device is currently granted the license; and conditioning, by the at least one processor, at least the storage of the most recent version of the first image within the node device on a determination that the node device is currently granted the license.

27. The computer-implemented method of claim 21, comprising:

receiving, by the at least one processor and from the node device, an indication of specialization of the node device to restrict the node device to executing a predetermined limited subset of types of application routines;

analyzing, by the at least one processor, the indication of specialization to identify a subset of multiple application routines that are among the limited subset of types of application routines, and for which images are available in the repository; and restrict, by the at least one processor, the analysis of the ability of the node device to provide the resource to determine whether the node device is able to support the execution of an application to the subset of multiple application routines.

28. The computer-implemented method of claim 21, wherein:

the node device allocates the resource by dynamically allocating multiple container environments that each consume a portion of the resource to enable execution of multiple application routines across the multiple container environments in parallel;

the resource comprises at least one of a processor of the node device or storage space within a storage of the node device; and the first image comprises at least one of a copy of the application routine or a copy of a library routine required to support the execution of the application routine within a container environment of the multiple container environments.

29. The computer-implemented method of claim 21, wherein:

the at least one portion of the contents of the cache comprises the second image;

the second image has been evicted from the cache in response to being least recently accessed or in response to being least frequently accessed; and the method further comprises, in response to a lack of match between the identity of the first image and an identifier of an image stored within the cache, performing operations comprising:

retrieving the most recent version of the first image from the repository; and storing the most recent version of the first image within the node device to trigger storage of a copy of the most recent version of the first image within the cache of the node device.

30. The computer-implemented method of claim 29, wherein:

at least one of a least recently accessed image of an executable routine or a least frequently accessed image of an executable routine among the at least one image of an executable routine stored within the cache is evicted from the cache to enable storage of another image of an executable within the cache in response to the other image being currently required to execute another application routine; and the method comprises repeating, by the at least one processor, the pre-pulling operations on a recurring interval of time.

\* \* \* \* \*